US011688299B2

(12) United States Patent
Nagasaka et al.

(10) Patent No.: US 11,688,299 B2
(45) Date of Patent: Jun. 27, 2023

(54) PROGRAMMING DEVICE AND RECORDING MEDIUM, AND PROGRAMMING METHOD

(71) Applicant: CASIO COMPUTER CO., LTD., Tokyo (JP)

(72) Inventors: Tomoaki Nagasaka, Koganei (JP); Shogo Hashimoto, Kokubunji (JP); Tomoharu Yamaguchi, Kodaira (JP); Tatsuya Sekitsuka, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/522,982

(22) Filed: Nov. 10, 2021

(65) Prior Publication Data

US 2022/0068160 A1    Mar. 3, 2022

Related U.S. Application Data

(62) Division of application No. 16/499,231, filed as application No. PCT/JP2018/006326 on Feb. 15, 2018, now Pat. No. 11,282,409.

(30) Foreign Application Priority Data

Mar. 27, 2017  (JP) ................. 2017-060807

(51) Int. Cl.
*G09B 19/00* (2006.01)
*G06F 9/44* (2018.01)
*A63H 17/395* (2006.01)

(52) U.S. Cl.
CPC .......... *G09B 19/0053* (2013.01); *G06F 9/44* (2013.01); *A63H 17/395* (2013.01)

(58) Field of Classification Search
CPC ..................................... G09B 19/00
See application file for complete search history.

(56) References Cited

U.S. PATENT DOCUMENTS

| 9,737,802 | B2 | 8/2017 | Shi et al. |
| 10,891,874 | B2 | 1/2021 | Kim et al. |
| 11,113,036 | B2 | 9/2021 | Nagasaka et al. |
| 2005/0026537 | A1 | 2/2005 | Hsieh et al. |

(Continued)

FOREIGN PATENT DOCUMENTS

| CN | 105765512 A | 7/2016 |
| JP | H05204620 A | 8/1993 |

(Continued)

OTHER PUBLICATIONS

Kubo Educational Robot (video available online: https://www.youtube.com/watch?v=bM9y4JB22NY), wherein the video was published on Jan. 29, 2017.*

(Continued)

*Primary Examiner* — James S. McClellan
(74) *Attorney, Agent, or Firm* — Holtz, Holtz & Volek PC

(57) ABSTRACT

A programming device including a shape indication section which receives at least one first user operation for indicating a shape by specifying two or more portions among a plurality of tangible portions arranged at different positions with each other in a planar direction; and a control section which generates a command list for moving a control target section along the indicated shape.

11 Claims, 19 Drawing Sheets

(56) References Cited

U.S. PATENT DOCUMENTS

| | | |
|---|---|---|
| 2008/0213735 A1 | 9/2008 | Shorr et al. |
| 2015/0095883 A1 | 4/2015 | Shi |
| 2015/0310238 A1 | 10/2015 | Shi et al. |
| 2015/0360366 A1 | 12/2015 | Gupta et al. |
| 2015/0364060 A1 | 12/2015 | Gupta et al. |
| 2016/0001180 A1 | 1/2016 | Shi |
| 2016/0210484 A1 | 7/2016 | Shi et al. |
| 2016/0346686 A1 | 12/2016 | Shi |
| 2016/0379519 A1 | 12/2016 | Gupta et al. |
| 2017/0004730 A1 | 1/2017 | Kim |
| 2017/0036344 A1 | 2/2017 | Gupta et al. |
| 2017/0236446 A1 | 8/2017 | Gupta et al. |
| 2017/0297195 A1 | 10/2017 | Gupta et al. |
| 2019/0108771 A1 | 4/2019 | Gupta et al. |
| 2021/0110735 A1 | 4/2021 | Nagasaka et al. |

FOREIGN PATENT DOCUMENTS

| | | |
|---|---|---|
| JP | 2001228963 A | 8/2001 |
| JP | 2015091282 A | 5/2015 |
| JP | 2017506781 A | 3/2017 |
| WO | 2015141803 A1 | 9/2015 |

OTHER PUBLICATIONS

"Cubetto: Robot for Teaching Coding and Programming to Children", [online], 2016, Primo Toys, [retrieved on Nov. 22, 2016], Internet <URL:https://www.primotoys.com/ja/>.

"ScratchJr—Home", [online], updated on May 17, 2016, MIT Media Lab, [retrieved on Nov. 22, 2016], Internet <URL:https://www.scratchjr.org/>.

Chinese Office Action (and English language translation thereof) dated Mar. 1, 2021 issued in Chinese Application No. 20180031594.9 (which is a Chinese counterpart of parent U.S. Appl. No. 16/499,231).

International Search Report (ISR) and Written Opinion dated May 22, 2018 issued in International Application No. PCT/JP2018/006326 (which is an International counterpart of parent U.S. Appl. No. 16/499,231).

International Search Report (ISR) and Written Opinion dated May 22, 2018 issued in International Application No. PCT/JP2018/006327 (which is an International counterpart of related U.S. Appl. No. 16/499,229).

Notice of Allowance dated Jun. 1, 2021 issued in related U.S. Appl. No. 16/499,229.

Office Action (Non-Final Rejection) dated Aug. 11, 2021 issued in parent U.S. Appl. No. 16/499,231.

Office Action (Non-Final Rejection) dated Mar. 4, 2021 issued in related U.S. Appl. No. 16/499,229.

Parrot RollinqSpider を自動航行させるアプリがあった, JIZOMAE のブログ, Apr. 16, 2015, [online], retrieved on: May 7, 2018, URL, http://jizomae.blog.jp/archives/27063026.html.

Related U.S. Appl. No. 16/499,229, First Named Inventor: Tomoaki Nagasaka; Title: "Programming Device and Recording Medium, and Programming Method"; Filed: Sep. 27, 2019.

Thoresen, et al., "Numerical Simulatio of Mutual Capacitance Touch Screens for ungrounded Objects", IEEE, 2017, retrieved online on May 22, 2021 pp. 5143-5152. Retrieved from the Internet: <URL: https://ieeexplore.ieee.org/stamp/stamp.jsp tp=&arnumber=7962288>. (Year: 2017).

* cited by examiner (a)

(b)

(a)

(b)

(c)

(a)

(b)

(a)

(b)

(a)

(b)

PROGRAMMING DEVICE AND RECORDING MEDIUM, AND PROGRAMMING METHOD

CROSS REFERENCE TO RELATED APPLICATIONS

This is a Divisional Application of U.S. application Ser. No. 16/499,231, filed on Sep. 27, 2019, which is a U.S. National Phase application of International Application No. PCT/JP2018/006326, filed Feb. 15, 2018, which is based on and claims priority from Japanese Patent Application No. 2017-060807, filed Mar. 27, 2017, the entire contents of all of which are incorporated herein by reference.

TECHNICAL FIELD

The present invention relates to a programming device and storage medium, and a programming method.

BACKGROUND ART

Conventionally, the importance of program development technology had been brought up along with the popularization of information and communication devices such as computers and mobile terminals and the development of control technology for various devices including them. Accordingly, in recent years the importance of programming education to children from an early age has been internationally recognized, and countries which adopt programming as a compulsory subject in the curriculum of compulsory education are increasing in number. In Japan as well, programming education has been incorporated into political policy. Therefore, it is expected that in the future there will be increasing interest in programming education among younger age groups.

In the background of such increasing interest in programming education, various programming education tools have been developed. For example, Patent Document 1 discloses a technique in which a program is created by a user directly holding physical blocks (objects) and actually moving them so as to one-dimensionally or two-dimensionally connect them, and the operation of an execution apparatus is controlled based on the program. This Patent Document 1 also discloses a technique in which a user directly holds each physical block (object) and actually moves it on a predetermined board so as to sequentially mount them, whereby a program is created to control the operation of a traveling robot.

Also, Non-Patent Document 2 discloses a technique in which programming is achieved by virtual blocks constituted by illustration icons being connected on the screen of an information terminal such as a tablet, whereby the movement of a character on the screen is controlled.

With these disclosed techniques, the configuration and execution status of a program can be intuitively learned by the traveling robot or the character sequentially performing functions set in connected or mounted blocks. Note that, in the present specification, programming by directly moving an object as shown in Patent Document 1 or Non-Patent Document 1 is referred to as tangible programming. On the other hand, programming by touching and moving virtual blocks, that is, virtual icons displayed on the screen of an electronic display such as a liquid crystal display as shown in Non-Patent Document 2 is referred to as visual programming. Also, in the present specification, "tangible" represents a state where an object is substantial and can be touched and felt in real space. Here, although an electronic display itself, such as a liquid crystal display itself, is tangible, operating an icon electronically displayed on such a display by touching its display screen is not a tangible operation.

PRIOR ART DOCUMENT

Patent Document

Patent Document 1: JP 05-204620

Non-Patent Documents

Non-Patent Document 1: "Cubetto: ROBOT FOR TEACHING CODING AND PROGRAMMING TO CHILDREN", [online], 2016, Primo Toys, [retrieved on Nov. 22, 2016], Internet <URL:https://www.primotoys.com/ja/>

Non-Patent Document 2: "ScratchJr—Home", [online], updated on May 17, 2016, MIT Media Lab, [retrieved on Nov. 22, 2016], Internet <URL:https://www.scratchjr.org/>

SUMMARY OF INVENTION

Problem to Be Solved By the Invention

It is considered in general that, in programming education to children about three year of age, a higher learning effect can be acquired by tangible programming, that is, programming by actually touching an object in real space and performing an operation of moving and deforming the object, in terms of intellectual development.

However, although the techniques described in Patent Document 1 and Non-Patent Document 1 are tangible programming, since their methods are to perform programming by connecting blocks having set functions by predetermined joint sections or sequentially mounting them on a predetermined board, the shape or arrangement of connected or mounted blocks as a whole and the movement direction of the execution apparatus or the traveling robot that is actually moved have no relation to each other. Therefore, children learning programming with these techniques cannot easily and intuitively grasp or understand a relation between the contents of their operations and the movements of the execution apparatus, and therefore may not sufficiently acquire effects of learning programming Moreover, the technology described in Non-Patent Document 2 is not tangible programming but visual programming That is, it is a method to perform programming only by an operation on the screen of a tablet or the like. This method is suitable for certain older children (generally more than 5 years of age). However, children about three years of age cannot easily and intuitively grasp or understand the operation procedure and operation contents thereof in programming, and therefore may not sufficiently acquire the effects of learning programming.

As described above, as educational tools for teaching programming to children, the techniques using tangible programming or visual programming are conventionally known. However, they can hardly be said to be techniques by which children can acquire sufficient effects of learning programming That is, no programming educational tool is known in which a user easily understands a relation between a programming operation by tangible programming and the movement direction of a control target section based on a program created by this operation.

Thus, in view of the above-described problems, an object of the present invention is to provide a programming device, a storage medium, and a programming method whereby a user can easily understand the relation between a programming operation by tangible programming and the movement direction of a control target section based on a program created by this operation.

Means for Solving the Problem

A programming device of the present invention comprising: a shape indication section which receives at least one first user operation for indicating a shape by specifying two or more portions among a plurality of tangible portions arranged at different positions with each other in a planar direction; and a control section which generates a command list for moving a control target section along the indicated shape.

A programming method of the present invention executed by a programming device comprising: a shape indication section and a control section, causing the shape indication section of the programming device to receive at least one first user operation of indicating a shape by specifying two or more portions among a plurality of tangible portions arranged at different positions with each other in a planar direction; and causing the control section of the programming device to generate a command list for moving a control target section along the shape indicated based on the at least one first user operation received by the shape indication section.

A non-transitory computer-readable storage medium of the present invention having a program stored thereon that is executable by a computer of a programming device including a shape indication section and a control section to actualize functions comprising: processing for causing the shape indication section of the programming device to receive at least one first user operation of indicating a shape by specifying two or more portions among a plurality of tangible portions arranged at different positions with each other in a planar direction; and processing for causing the control section of the programming device to generate a command list for moving a control target section along the shape indicated based on the at least one first user operation received by the shape indication section.

DESCRIPTION OF EMBODIMENTS

A programming device, a control program therefor, and a programming method according to the present invention will hereinafter be described in detail with reference to preferred embodiments. Here, for simplification of description, a case is described in which a child who is three years old or younger creates programs for controlling the operating state of a target device that is a movable object by use of a programming educational device to which the programming device according to the present invention has been applied.

First Embodiment (Programming Educational Device)

Figure 1:
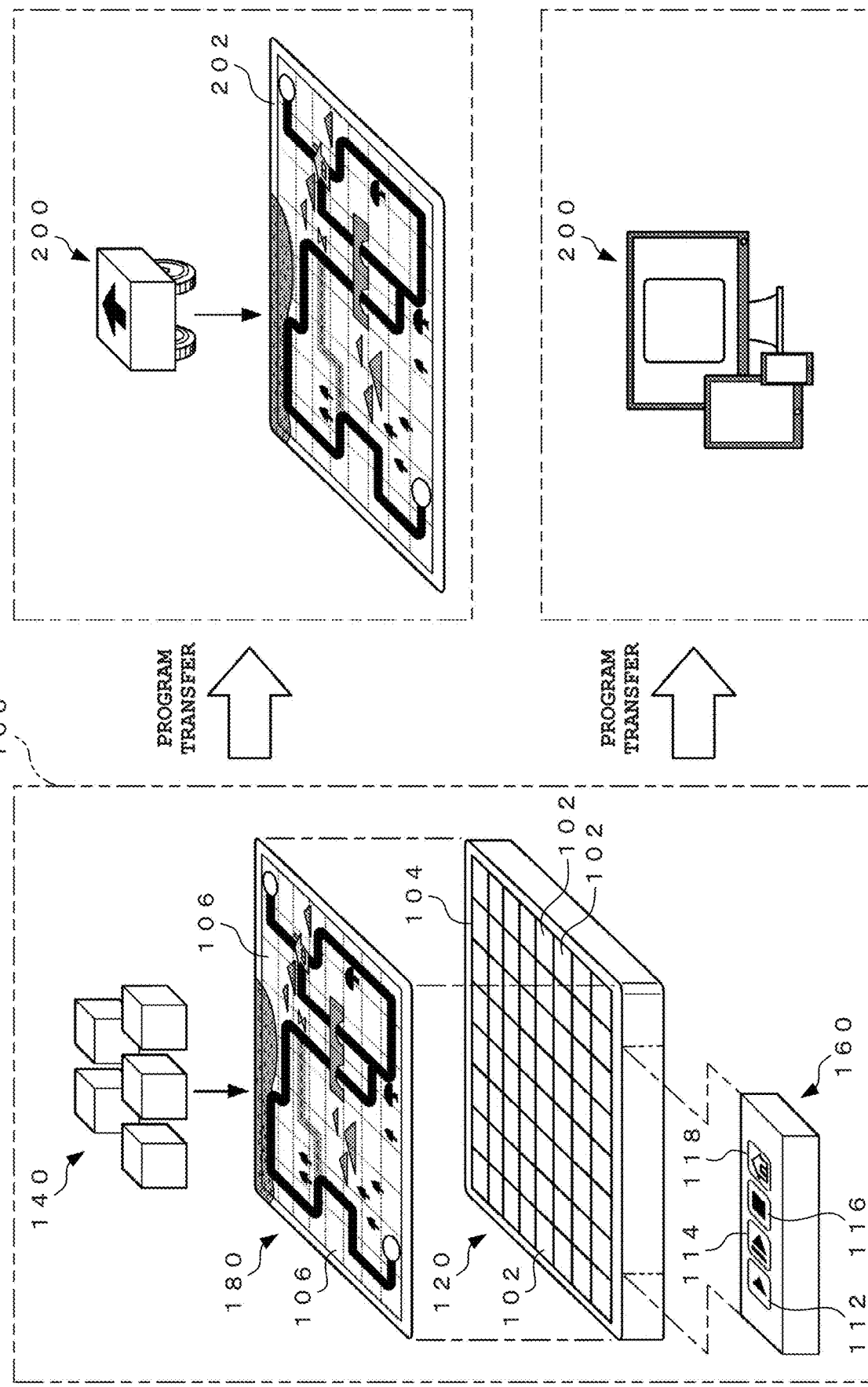
FIG. 1 is a schematic diagram showing an embodiment of a programming educational device to which the programming device according to the present invention has been applied.
Figure 2:
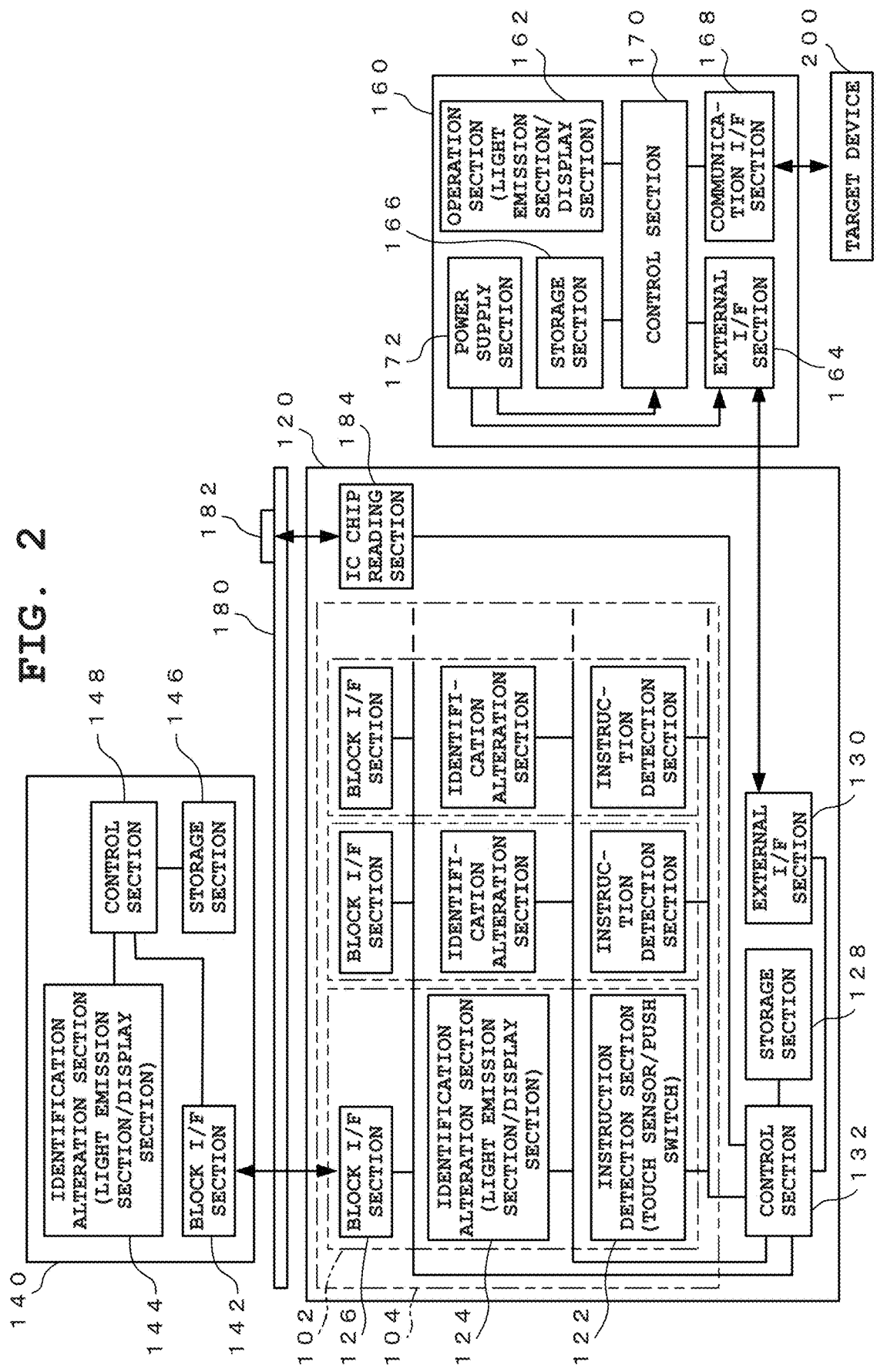
FIG. 2 is a function block diagram showing a structural example of the programming educational device according to the present embodiment.
Figure 3:
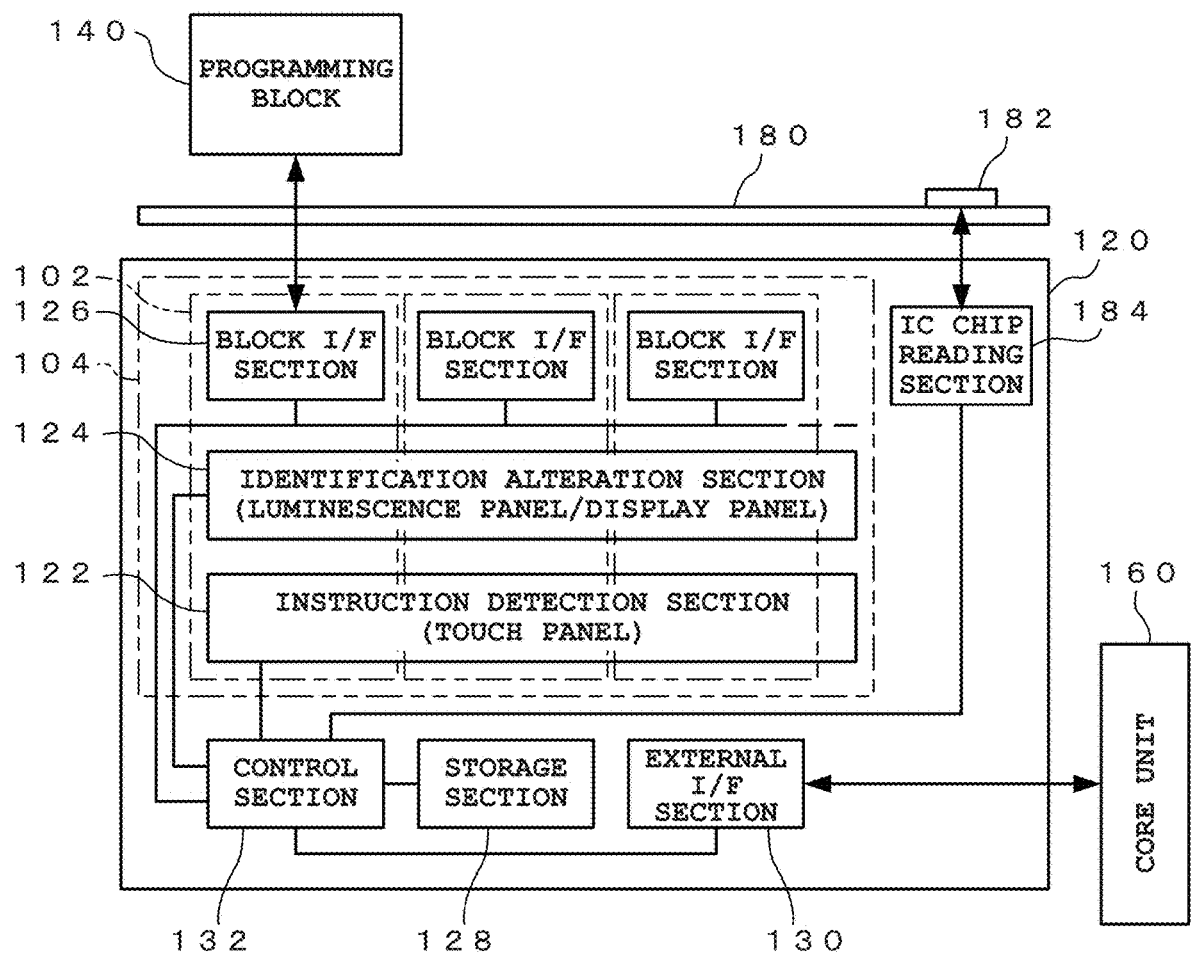
FIG. 3 is a function block diagram showing another structural example of the programming educational device according to the present embodiment.

FIG. 1 is a schematic diagram showing an embodiment of a programming educational device to which the programming device according to the present invention has been applied. FIG. 2 is a function block diagram showing a structural example of the programming educational device according to the present embodiment, and FIG. 3 is a function block diagram showing another structural example of the programming educational device according to the present embodiment.

The programming educational device according to the present embodiment mainly includes, for example, a programming control device 100 and a target device 200, as shown in FIG. 1. The programming control device 100 receives input operations performed by a user who is a programming education target, acquires information according to the received input operations, and generates programs for controlling the operating state of the target device 200. The target device 200 is a tangible or intangible movable object, and its operating state is controlled by the programs transferred from the programming control device 100. Hereinafter, the programming control device 100 and the target device 200 are explained in detail.

(Program Control Device)

The program control device 100 includes, for example, a programming board 120, programming blocks 140, a core unit 160, and a programming guide sheet (hereinafter referred to as "guide sheet") 180, all of which are tangible, as shown in FIG. 1.

(Programming Board 120)

The programming board 120 is a tangible object that can be directly and physically touched in real space and has, for example, a substantially plate shape whose one side (top surface) is provided with a programming area 104 where a plurality of tangible areas 102 having the same planar shape have been two-dimensionally arranged adjacent to one another in a matrix direction, as shown in FIG. 1. This programming area 104 functions as an input device that acquires instruction information given by a later-described tangible input operation by the user, and each area 102 of this programming area 104 corresponds to a position in an absolute coordinate system where the later-described target device 200 is moved. Here, for example, each area 102 has a rectangular planar shape such as a square or a rectangle, and these areas 102 are arranged in a lattice shape, as shown in FIG. 1. Note that the planar shape of each area 102 may be a polygonal shape such as an octagon or a circular shape instead of the rectangular shape.

Specifically, the programming board 120 includes, for example, instruction detection sections 122, identification alteration sections 124, block interface sections (hereinafter referred to as "block I/F sections") 126, a storage section 128, an external interface section (hereinafter referred to as "external I/F section") 130, and a control section 132, as shown in FIG. 2.

Each instruction detection section 122 detects the user's instruction performed on an area 102 of the programming area 104. Specifically, the instruction detection sections 122 have, for example, touch sensors or mechanical switches such as push switches individually provided corresponding to each area 102 of the programming area 104, as shown in FIG. 2. When a state is detected in which the user's finger or the like has come in contact with an area 102 via its touch sensor or has pressed an area 102 via its push switch, the corresponding instruction detection section 122 identifies this area (indicated area) on the programming area 104. Information (hereinafter referred to as "indicated position information") regarding the position of each indicated area acquired by the instruction detection sections 122 is stored in order in a storage area of the storage section 128 described later. Here, each touch sensor to be applied for the instruction detection sections 122 may be a capacitive touch sensor or may be a pressure-sensitive touch sensor. Also, each push switch to be applied for the instruction detection sections 122 should preferably have a mechanism where an ON state and an OFF state are switched every time the user performs a depression operation, and the top surface of each push switch returns to be at the same height (referred to as "reference height" for convenience of explanation) as that of the programming area 104 after it is pressed (That is, the top surface of each push switch always returns to be at the reference height).

In FIG. 2, the structure has been shown in which touch sensors or push switches have been individually provided corresponding to each area 102 of the programming area 104. However, the present invention is not limited thereto. For example, a structure such as that shown in FIG. 3 may be adopted in which a common touch panel is provided on the entire programming area 104 as an instruction detection section 122. In this structure, the instruction detection section 122 detects a state where the user's finger or the like has come in contact with a position corresponding to an area 102 of the touch panel, and thereby identifies the position of the indicated area 102 in the programming area 104. In this structure as well, the touch panel may be a capacitive touch panel or may be a pressure-sensitive touch panel. With this structure, the resolution of the touch panel of the instruction detection section 122 is improved and each indicated area 102 can be more finely detected. Accordingly, not only a straight route (or a route in an orthogonal direction) but also a route having a smooth curve can be set as a movement route of the target device 200. In the structure shown in FIG. 3, a luminescent panel or a display panel which is shared in the entire programming area 104 is provided as an identification alteration section 124. However, in this structure where a touch panel is provided as an instruction detection section 122, identification alteration sections 124 individually corresponding to each area 102 may be provided.

Each identification alteration section 124 alters an area (indicated area) indicated by the user to be visually distinguishable from areas which have not been indicated. Specifically, the identification alteration sections 124 have, for example, light emission sections or display sections individually provided corresponding to each area 102 of the programming area 104, as shown in FIG. 2. For example, as the light emission sections to be applied in the identification alteration sections 124, light emitting diodes (LEDs) may be used. Also, as the display sections, display means using a liquid crystal or an organic EL element may be used. In a programming operation by the use of the programming board 120, each identification alteration section 124 causes the light emission section of an area 102 where the user's instruction has been detected by the corresponding instruction detection section 122 to emit light with a predetermined light emission color, a predetermined light emission intensity, and a predetermined light emission pattern, or changes an image displayed on the display section of the area 102, whereby this area 102 can be visually differentiated from the other areas.

Also, when programs generated based on programming operations are executed to drive the target device 200, each identification alteration section 124 causes the light emission section of an area 102 corresponding to a movement position of the target device 200 to emit light with a predetermined light emission color, a predetermined light emission intensity, and a predetermined light emission pattern, or changes an image displayed on the display section of the area 102, whereby this area 102 can be visually differentiated from the other areas. Note that examples of the alteration status of each identification alteration section 124 (the light emission status of its light emission section) at the time of programming operation and the time of program execution are described later in detail in descriptions of the programming method.

In FIG. 2, the structure has been shown in which, as the identification alteration sections 124, light emission sections or display sections have been individually provided corresponding to each area 102 of the programming area 104. However, the present invention is not limited thereto. For example, a structure such as that shown in FIG. 3 may be adopted in which a common luminescence panel or a common display panel is provided on the entire programming area 104 as an identification alteration section 124. In this structure, in a programming operation, the identification alteration section 124 causes a portion of the luminescence panel corresponding to an area 102 indicated by the user to emit light with a predetermined light emission color, a predetermined light emission intensity, and a predetermined light emission pattern, or changes an image displayed on the indicated area on the display panel, whereby this area 102 can be visually differentiated from the other areas. Also, when a program generated based on a programming operation is executed, the identification alteration section 124 causes an area on the luminescence panel which corresponds to a movement position of the target device 200 to emit light with a predetermined light emission color, a predetermined light emission intensity, and a predetermined light emission pattern or changes an image displayed on the display panel, whereby this area can be visually differentiated from the other areas. Note that, as a luminescence panel or a display panel to be applied as the identification alteration section 124, a panel where LEDs have been two-dimensionally arranged, a liquid crystal display panel, or an organic EL display panel can be used. With this structure, the resolution of the luminescence or touch panel of the identification alteration section 124 is improved, and more colorful luminescence operations and display operations can be performed with higher definition. Accordingly, the movement route of the target device 200 and the corresponding areas can be vividly and clearly differentiated at the time of programming operation and the time of program execution. In the structure shown in FIG. 3, a common touch panel is provided in the entire programming area 104 as an instruction detection section 122. However, in this structure where a luminescence panel or a display panel is provided as an identification alteration section 124, instruction detection sections 122 individually corresponding to each area 102 may be provided. Also, a structure may be adopted in which, in addition to the light emission sections or the display sections, audio sections or vibration sections are further provided in the identification alteration sections 124, and each identification alteration section 124 changes the amplitude, frequency, and pattern of sound or vibration. By this structure, indicated areas 102 can be more unfailingly differentiated through the user's auditory sense and tactile sense, in addition to his or her visual sense.

Each block I/F section 126 detects the presence of a programming block 140 placed on an area 102 in the programming area 104, and receives information (hereinafter referred to as "function information") regarding a specific function operation set in advance in this programming block 140. Specifically, the block I/F sections 126 have non-contact or contact type interfaces individually provided corresponding to each area 102 of the programming area 104. When one of the block I/F sections 126 detects, by its non-contact or contact type interface, a state where a programming block 140 has been placed on an indicated area in the programming area 104, this block I/F section 126 identifies the position of the programming block 140 in the programming area 104, and receives the function information of the programming block 140. The information (hereinafter referred to as "block position information") regarding the position of the programming block 140 and the function information acquired by the block I/F section 126 are associated with each other and stored in order in the storage area of the storage section 128 described later. Here, in a structure where non-contact type interfaces have been applied as the block I/F sections 126, a method using short distance radio communication technology such as NFC (Near Field Communication) that is used for electronic money cards or the like, or an optical communication method using infrared rays or the like may be adopted. Also, in a structure where contact type interfaces have been applied, a method may be adopted in which terminal electrodes are directly connected to each other.

Note that, in a case where each instruction detection section 122 has a capacitive touch sensor or touch panel, a configuration may be adopted in which a dielectric material whose permittivity is substantially the same as the human body is used to a part or the entire area of each programming block 140, and whether a programming block 140 has been placed on (brought into contact with) the programming area 104 (whether there is a programming block 140) is detected by the corresponding instruction detection section 122. Also, in a case where each instruction detection section 122 has a pressure-sensitive touch sensor or touch panel or a push switch, a configuration may be adopted in which whether a programming block 140 has been placed on (brought into contact with) the programming area 104 (whether there is a programming block 140) is detected by the corresponding instruction detection section 122 by the programming area 104 being lightly pressed by the programming block 140.

The storage section 128 sequentially stores indicated position information regarding the positions of indicated areas 102 acquired by the instruction detection sections 122 in a storage area. Here, by arranging the indicated position information stored in the storage area of the storage section 128 in chronological order, information regarding the sequence of the user's instructions (hereinafter referred to as "sequential order information") can be acquired. The above-described indicated position information and sequential order information define the movement route of the target device 200 whereby the operating state is controlled by the user's programming operations. That is, when the user indicates two or more adjacent areas 102 in the programming area 104, a virtual route defining a movement route of the target device 200 is determined. In other words, a virtual route is determined by the user indicating two or more adjacent areas 102 in the programming area 104 and, when supposing that a group of line segments each of which has been created by the connection of two adjacent areas 102 in the virtual route is a first shape, a route corresponding to this first shape (in the first embodiment, a route having a similar shape as the first shape) is defined as a movement route of the target device 200. Also, the storage section 128 associates block position information regarding the position of a programming block 140 acquired by a block I/F section 126 with function information regarding a specific function operation set in the programming block 140 and stores them. This storage section 128 may store a program for controlling the operation of each section of the programming board 120 by the later-described control section 132 and various types of information. That is, the storage section 128 has a RAM (Random Access Memory) and a ROM (Read-Only Memory).

The external I/F section 130 performs communication between the programming board 120 and the core unit 160 described later, and transmits indicated position information, sequential order information, block position information, and function information (hereinafter collectively referred to as "input operation information") stored in the storage area of the storage section 128 to the core unit 160. Specifically, the external I/F section 130 has a non-contact or contact type interface. Here, in a structure where a non-contact interface has been applied as the external I/F section 130, a wireless communication method such as NFC, Bluetooth (registered trademark), Wi-Fi (Wireless Fidelity; registered trademark) or an optical communication method using infrared rays can be used. Also, in a structure where a contact type interface has been applied as the external I/F section 130, a cable communication method using various types of communication cables or a method where terminal electrodes are directly connected to each other can be used.

The control section 132 is a processor of a computer which controls the operation of each section of the programming board 120 having the instruction detection sections 122, the identification alteration sections 124, the block I/F sections 126, the storage section 128, and the external I/F section 130. In particular, when the user's instructions performed on areas 102 in the programming area 104 are detected by the instruction detection sections 122, the control section 132 sequentially stores the indicated position information of these areas 102 in the storage area of the storage section 128. In addition, the control section 132 causes these areas 102 to emit light in predetermined light emission states or changes displayed images by the corresponding identification alteration sections 124 so as to alter the areas to be visually differentiated. Also, when a state where a programming block 140 has been placed on an indicated area 102 is detected by the corresponding block I/F section 126, the control section 132 acquires function information set in this programming block 140 via the block I/F section 126, and stores the function information and the block position information of the programming block 140 in association with each other in the storage area of the storage section 128. Also, the control section 132 transmits various types of information stored in the storage area of the storage section 128 by programming operations to the core unit 160 via the external I/F section 130.

(Programming Blocks 140)

Each programming block 140 is a tangible object that can be directly and physically touched in real space, has a substantially cubical (or substantially rectangular parallelepiped) shape, and is placed on an arbitrarily indicated area 102 in the programming area 104 of the programming board 120 by the user, as shown in FIG. 1. This programming block 140 functions as an input device for defining a specific function operation that is performed without any movement between areas 102 in the programming area 104 when the target device 200 is operated. Here, the programming blocks 140 may be configured to be individually (single tier) placed in the programming area 104 or may be configured to be (plurally) stacked as multi-tiered blocks. Also, the three-dimensional shape of each programming block 140 is not limited to a cubic shape or a rectangular parallelepiped shape, and may be any polyhedron shape as long as the programming blocks 140 can be stably placed in the programming area 104 and can be stably stacked on one another. Also, it is not limited to these examples and may be a shape whose surface is partially a curved shape, such as a substantially cylindrical shape, a substantially conical shape, a substantially truncated-conical shape, a substantially sphere shape, and a substantially hemisphere shape. Also, in order to stably place the programming blocks 140 in the programming area 104 or stably pile them on one another and to unfailingly transmit function information described later, the undersurface of a placed programming block 140 should preferably and appropriately comes in close with the upper surface of the programming board 120 or the upper surface of another programming block 140 where the programming block 140 has been placed. Accordingly, their contact surfaces may have convex and concave shapes which engage with each other, or may be formed to be magnetically attached to each other.

Specifically, each programming block 140 has, for example, a block I/F section 142, an identification alteration section 144, a storage section 146, and a control section 148, as shown in FIG. 2.

The block I/F section 142 performs communication between the programming block 140 and the programming board 120, and directly transmits function information stored in a storage area of the storage section 146 described later to the programming board 120. Also, when programming blocks 140 have been stacked to be multi-tiered in the programming area 104, their block I/F sections 142 perform communication among them, and sequentially transmit function information transmitted from an upper programming block 140 to a lower programming block 140 or the programming board 120. As a result, function information stored in the storage area of the storage section 146 of each stacked programming block 140 is stored in the storage area of the storage section 128 of the programming board 120 in their tiered order (ascending or descending order).

More specifically, the block I/F section 142 has non-contact or contact type interfaces individually provided on a placement surface side (the undersurface side of the three-dimensional shape in FIG. 1) where the programming block 140 comes in contact with the programming board 120 and a surface side (the top surface side of the three-dimensional shape in FIG. 1) which is positioned opposing the contact surface and comes in contact with another programming block 140 stacked as an upper tier. When the non-contact or contact type interfaces detect a state where the programming block 140 has been placed on an indicated area in the programming area 104 and a state where another programming block 140 has been stacked on the programming block 140, the block I/F section 142 reads out function information regarding a specific function operation of the target device 200, which is set in advance in each programming block 140, from the storage area of the storage section 146 and transmits it to the programming board 120 directly or via a programming block 140 stacked as a lower tier. Here, the interface applied between the programming block 140 and the programming board 120 and the interface applied between the programming block 140 and another programming block 140 should preferably be using the same method, and one of the various methods applied for each block I/F section 126 of the programming board 120 described above can be used.

In the present embodiment, the structure has been described in which the interfaces of the block I/F section 142 are individually provided on the two surfaces of the cubical programming block 140 which are the surface (the lower surface side of the three-dimensional shape) that comes in contact with the programming board 120 and the surface (the upper surface side of the three-dimensional shape) that comes in contact with another programming block 140 serving as an upper tier. However, the present invention is not limited thereto. For example, a structure may be adopted in which these interfaces of the block I/F section 142 are provided on all the six surfaces of the programming block 140 or a common interface is provided thereon so that the transmission and reception of function information and the like can be performed between the programming block 140 and the programming board 120 or another programming block 140 regardless of which surface of the cube comes in contact with the programming board 120 as a placement surface or which surface comes in contact with another programming block 140 stacked thereon.

The identification alteration section 144 has a light emission section or a display section. In a programming operation using the programming board 120, when a state where the programming block 140 has been placed on an area 102 in the programming area 104 is detected by the block I/F section 142, the identification alteration section 144 causes the light emission section to emit light in a predetermined light emission state or changes an image displayed on the display section so as to visually differentiate the programming block 140 from the other programming blocks 140, as with each identification alteration section 124 of the programming board 120 described above.

Note that, as the above-described display section to be applied in the identification alteration section 144, a display section may be adopted which changes a displayed image without electrical power. For example, a structure that uses magnetic force may be adopted in which a permanent magnet is provided in each portion of the programming board 120 corresponding to the areas 102 of the programming area 104 and in each programming block 140 and, when a programming block 140 is placed on an area 102, its display section is rotated by attraction force or repelling force occurred between a permanent magnet in the programming board 120 and a permanent magnet in the programming block 140, whereby an image thereon is changed. Also, a mechanical structure may be adopted in which a convex section that is internally pressed and displaced by being placed on the programming board 120 is provided on at least one side of each programming block 140 which is placed on the programming board 120. In this structure, when a programming block 140 is placed on an area 102, the convex section of the programming block 140 is internally pressed and displaced, and its display section is rotated in conjunction with the displacement, whereby an image thereon is changed.

Also, when specific function operations set in advance are performed by the target device 200 by programs created based on programming operations, the corresponding identification alteration sections 144 cause the light emission sections of their programming blocks 140 that have defined the function operations of the target device 200 to emit light in predetermined light emission states or changes images displayed on the display sections of the programming blocks 140 so as to visually differentiate the programming blocks 140 from the other programming blocks 140.

Note that each identification alteration section 144 may be structured to include an audio section or a vibration section in addition to the above-described light emission section or display section, and change the amplitude, frequency, and pattern of sound or vibration, as with each identification alteration section 124 of the programming board 120 described above. By this structure, programming blocks 140 that have defined function operations can be more unfailingly differentiated through the user's auditory sense and tactile sense, in addition to his or her visual sense.

The storage section 146 has stored therein function information that is ID information defining a specific function operation (what is called "action") which is performed without any movement between areas 102 in the programming area 104 when the target device 200 is operated. Here, examples of this specific function operation which can be set for the target device 200 include, for example, an operation to control a light emission section to emit light in a predetermined light emission state, an operation to change an image displayed on a display section, an operation to control an audio section to emit a predetermined sound or a musical tone, an operation to control a vibration section to vibrate with a predetermined pattern, an operation to control the target device 200 to rotate or jump, an operation to control an imaging section to capture an image of a surrounding area, an operation to perform sensing actions by various sensors and the like at a position corresponding to an area 102 where a programming block 140 has been placed. The function information herein may be information defining the execution of one of the above-described function operations, or may be information defining the execution of a combination of plural function operations. That is, in the target device 200, a light emission section, an audio section, a vibration section, an imaging section, various sensors and the like are provided in advance so as to actualize the above-described function operations.

Also, the storage section 146 temporarily stores, in its storage area, function information transmitted from another programming block 140 stacked on its own programming block 140. Furthermore, the storage section 146 may store a program for controlling the operation of each section of the programming block 140 by the later-described control section 148 and various types of information. That is, the storage section 146 includes a RAM and a ROM.

In the present embodiment, function information defining a function operation or a combination of plural function operations for the programming block 140 is fixedly stored in advance in the storage area of the storage section 146. However, the present invention is not limited thereto. For example, a configuration may be adopted in which function information defining a plurality of function operations for the programming block 140 is stored in advance in the storage area of the storage section 146, and an arbitrary function operation is selected and set from among the plurality of function operations based on a setting change by software, an operation on a selector switch, the detection of the inclination of the programming block 140 or the detection of an impact thereon by a gravity sensor and an acceleration sensor and the like.

Also, another configuration may be adopted in which the interfaces of the block I/F section 142 are provided on all the six surfaces of the programming block 140 having a cubic shape, function operations different from one another are associated with the six surfaces, respectively, and function information regarding each function operation is stored in the storage area of the storage section 146. When a surface that is in contact with the programming board 120 is detected by the corresponding interface of the block I/F section 142 on this surface, function information regarding a function operation associated with this contact surface is read out from the storage area of the storage section 146 and transmitted to the programming board 120. By this configuration, plural types of function operations associated with the surfaces of the programming block 140 which come in contact with the programming board 120 are set. In this case where function operations different from another are respectively associated with two or more surfaces of the programming block 120, for example, a structure may be adopted in which a symbol, an illustration, a character, an image or the like representing a function operation associated with a contact surface is drawn on the surface (cube upper surface) opposing this contact surface (cube lower surface) that comes in contact with the programming board 120, so that the contents of the function operation to be performed by the target device 200 can be intuitively and visually recognized.

The control section 148 is a processor of a computer which controls the operation of each section of the programming block 140 including the block I/F section 142, the identification alteration section 144, and the storage section 146. In particular, when a state where the programming block 140 has been placed on an indicated area 102 in the programming area 104 is detected by the block I/F section 142, the control section 148 transmits function information set in the programming block 140 to the programming board 120 via the block I/F section 142, and causes the programming block 140 to emit light in a predetermined light emission state or changes an image displayed thereon by the identification alteration section 144 so as to alter the programming block 140 to be visually distinguishable. Also, when a state where other programming blocks 140 have been stacked on the programming block 140 is detected by the block I/F section 142, the control section 148 sequentially transmits function information from an upper programming block 140 to a lower programming block 140 or to the programming board 120.

(Core Unit 160)

The core unit 160 has, for example, a rectangular parallelepiped shape or a flat plate shape, and operation switches are arranged on one side (the upper surface in the drawing) thereof, as shown in FIG. 1. This core unit 160 functions as a control device that generates programs for operating the target device 200 based on information acquired by programming operations performed using the programming board 120, and executes the programs so as to control the operating state of the target device 200.

More specifically, the core unit 160 includes, for example, an operation section 162, an external I/F section 164, a storage section 166, a communication interface section (hereinafter referred to as "communication I/F section") 168, a control section 170 and a power supply section 172, as shown in FIG. 2.

The operation section 162 generates, by a user operation, a program based on information acquired by a programming operation performed using the above-described programming board 120, and gives an instruction on the execution status of the program. More specifically, the operation section 162 has a plurality of push switches or touch sensors or a touch panel for selecting the execution status of a generated program. In the present embodiment, the operation section 162 has arranged thereon push switches such as a batch execution switch 112 for collectively executing all programs generated by the control section 170 described below, a stepwise execution switch 114 for executing commands given by programs step by step, an execution stop switch 116 for stopping a program currently being executed, and a home switch 118 for returning the target device 200 to its initial position (start point), as shown in FIG. 1. When a state is detected in which the user has depressed or touched one of the switches, the operation section 162 outputs a control signal for instructing the generation of a program and its execution status to the later-described control section 170 in response to the switch operation.

The external I/F section 164, which performs communication between the core unit 160 and the programming board 120, receives input operation information transmitted from the programming board 120, and stores it in a storage area of the storage section 166. The storage section 166 stores this input operation information received from the programming board 120 via the external I/F section 164 in its predetermined storage area and stores, in another storage area, programs generated by the later-described control section 170 based on this information. This storage section 166 may store a program that is used to generate, in the control section 170, programs for controlling the operating state of the target device 200 based on received input operation information, a program for controlling the operation of each section of the core unit 160, and various types of information. That is, the storage section 166 has a RAM and a ROM.

The communication I/F section 168 performs communication between the core unit 160 and the target device 200, and transmits programs stored in the storage area of the storage section 166 to the target device 200. Specifically, the communication I/F section 168 has a non-contact or contact type interface. In a structure where a non-contact interface has been adopted, a wireless communication method such as Wi-Fi (registered trademark) and Bluetooth (registered trademark) or an optical communication method using infrared rays can be used. Also, in a structure where a contact type interface has been adopted, a cable communication method using a communication cable can be used.

The control section 170 is a processor of a computer that controls the operation of each section of the core unit 160 including the operation section 162, the external I/F section 164, the storage section 166, the communication I/F section 168, and the power supply section 172 described later. In particular, when the operation section 162 detects the user's instruction regarding the generation or execution of programs, the control section 170 generates programs for controlling the operating state of the target device 200 based on input operation information transmitted from the programming board 120.

More specifically, when the batch execution switch 112 or the stepwise execution switch 114 is operated and its depressed or contact state is detected in the operation section 162, the control section 170 generates one or plural programs including commands for controlling the operating state (movement and function operation) of the target device 200, based on input operation information (indicated position information, sequential order information, block position information, and function information) transmitted from the programming board 120. Here, each piece of the above-described information acquired by programming operations performed using the programming board 120 corresponds to a program source code, and the control section 170 compiles this source code into a machine language program that is executable in the target device 200. The program acquired by the compiling processing is stored in the storage area of the storage section 166. Note that this compiling processing may be collectively performed for all programs, or may be performed for each command of one step of the programs.

Also, the control section 170 transmits generated programs to the target device 200 in response to a switch operation performed on the operation section 162, and thereby controls the operating state of the target device 200. Furthermore, the control section 170 controls the supply status of driving power for each section of the core unit 160, the programming board 120, and the programming block 140 by the power supply section 172.

The power supply section 172 supplies driving power to each section of the core unit 160. Also, by the core unit 160 and the programming board 120 being connected, the power supply section 172 supplies driving power to each section of the programming board 120 via the external I/F sections 164 and 130. The electric power supplied to the programming board 120 is further supplied to each programming block 140 through their block I/F sections 126 and 142. Here, for example, the power supply section 172 may receive electric power from a commercial AC supply, or may be provided with primary batteries such as dry cells or rechargeable batteries such as lithium ion batteries, or a power generation section by energy harvesting technology.

In the present embodiment, only the core unit 160 is equipped with a power supply section, and the programming board 120 and the programming blocks 140 are not equipped with a power supply section. In this embodiment, by the core unit 160 and the programming board 120 being connected, driving electric power is supplied to the programming board 120 from the core unit 160 via power supply mechanisms in their external I/F sections 164 and 130. In addition, by programming blocks 140 being placed on the programming board 120, driving electric power is supplied to the programming blocks 140 from the programming board 120 via power supply mechanisms in their block I/F sections 126 and 142. Here, as these power supply mechanisms which are provided in the external I/F sections 130 and 164 and the block I/F sections 126 and 142, non-contact type power supply mechanisms such as electromagnetic induction type power supply mechanisms or contact type power supply mechanisms where cables and terminal electrodes are directly connected may be adopted.

Also, as another structure that can be applied to the present invention, a structure where the programming board 120 and the programming blocks 140 have unique power supply sections or a structure where the programming board 120 or the programming blocks 140 have unique power supply sections may be adopted. In the structure where the programming board 120 has a unique power supply section, a configuration may be adopted in which driving electric power is supplied to programming blocks 140 from the programming board 120 via power supply mechanisms in their block I/F sections 126 and 142.

With this structure where at least the programming board 120 has a unique power supply section, the user can perform programming operations using the programming board 120 and programming blocks 140 even when the core unit 160 has not been connected to the programming board 120. In addition, program generation processing based on input operation information and the control of the operating state of the target device 200 can be performed with the core unit 160 being separated from the programming board 120 and being independent (that is, by the core unit 160 alone), when a switch of the operation section 162 is operated.

(Guide Sheet 180)

The guide sheet 180 is, for example, a tangible thin film or board which is light transmissive (transparent or semi-transparent), and placed and mounted on the programming area 104 of the programming board 120, as shown in FIG. 1. On the guide sheet 180, images (illustrations, photographs, numbers, characters, signs and the like) for supporting and guiding the user's programming operation are drawn in advance. In other words, on the guide sheet 180, information for indicating a virtual route that defines a movement route of the target device 200 has been recorded. Here, on the guide sheet 180, a plurality of partitions 106 corresponding to each area 102 of the programming area 104 of the programming board 120 are provided, and the above-described images are drawn with these partitions 106 as base units. More specifically, for example, in a case where roads and lanes are drawn on the guide sheet 180, images therefor are successively provided on adjacent partitions 106. In a case where houses and trees are drawn, images therefor are provided in units of one or a plurality of partitions 106.

Also, when performing a programming operation of determining a virtual course for defining a movement route of the target device 200, the user touches or depresses one of the plurality of partitions 106 of the guide sheet 180, as described above. In the case where a capacitive touch sensor is applied as each instruction detection section 122, the guide sheet 180 has characteristics (dielectric characteristics) of protecting the programming area 104 and appropriately transmitting to each touch sensor the contact status of a dielectric substance such as the user's finger. In this case, in response to the above-described touch operation, an instruction detection section 122 detects a capacitance change in an area 102 of the programming area 104 of the programming board 120 right under the touched partition 106, as with a case where the area 102 is directly touched. Also, in the case where a pressure-sensitive touch sensor or a push switch is applied as each instruction detection section 122, this instruction detection section 122 detects, in response to the above-described touch operation, a displacement of an area 102 of the programming area 104 of the programming board 120 right under the pressed partition 106, as with a case where the area 102 is directly pressed.

On partitions 106 of the guide sheet 180 placed on the programming board 120 (which correspond to areas 102 of the programming area 104), programming blocks 140 are placed in accordance with function operations which are performed by the target device 200, as described above. Then, information is transmitted and received between each programming block 140 and the programming board 120 via the guide sheet 180 by using a predetermined communication method. Here, in a case where a method using wireless communication technology such as NFC is adopted for the block I/F sections 142 and 126 of each programming block 140 and the programming board 120, the guide sheet 180 has a characteristic or a form that transmits radio waves used for this communication. Also, in a case where a method using optical communication such as infrared communication is adopted for the block I/F sections 142 and 126, the guide sheet 180 has a characteristic or a form that transmits infrared light. Moreover, in a case where a method is adopted in which terminal electrodes are directly connected to each other, the guide sheet 180 may have a structure in which an opening section (through-hole) where the block I/F section 142 of a programming block 140 and a block I/F section 126 of the programming board 120 directly come in contact with each other is provided in each partition 106, or a structure in which a through electrode (conductive material exposed from both the front and rear surfaces of the guide sheet 180) for electrically connecting these block I/F sections 142 and 126 is provided in each partition 106.

Then, based on roads, obstacles and the like drawn on the guide sheet 180, the user sequentially indicates areas 102 of the programming board 120 via the guide sheet 180, and thereby determines a virtual course for defining a movement route of the target device 200. By plural types of guide sheets 180 having specific images related to programming operations as described above being prepared in accordance with the contents of programming and a guide sheet 180 to be attached to the programming area 104 being suitably replaced, programming operations having different contents can be appropriately supported and the efficiency of programming learning can be improved.

Also, by a programming operation using such a guide sheet 180, when an area 102 indicated by the user's programming operation or an area 102 corresponding to a movement position of the target device 200 at the time of the execution of a generated program is caused to emit light in a predetermined light emission state or caused to change its displayed image by the corresponding identification alteration section, this light or image is visually recognized through the light transmissive guide sheet 180.

(Target Device 200)

The target device 200 is a target of programs generated by the program control device 100 based on an input operation by the user. In the present embodiment, as the target device 200, a self-propelled tangible toy that runs on the ground in real space is adopted as shown in, for example, FIG. 1. However, any object may be adopted as the target device 200 as long as its operating state can be controlled based on a generated program. Also, in addition to a tangible movable object, an object may be adopted which is in application software performed in a mobile terminal such as a smartphone or a tablet or an information communication device such as a personal computer, or in a virtual space actualized by this application software. That is, an intangible movable object may be adopted.

In the case where the target device 200 is a tangible movable object, this target device 200 includes a communication I/F section, a driving section, a storage section, a function section, a power supply section and a control section. The communication I/F section of the target device 200 communicates with the communication I/F section 168 of the core unit 160, and receives programs generated by the control section 170 of the core unit 160. Also, the storage section stores the programs received by the communication I/F section of the target device 200. The control section controls the function section, the driving section, the power supply section and the like described later in detail in accordance with the programs stored in the storage section of the target device 200, and operates the target device 200.

By the user sequentially indicating areas 102 of the programming area 104 covered with the guide sheet 180 by performing programming operations using the programming board 120, the target device 200 is moved along a movement route corresponding to a determined virtual route. Here, the target device 200 is moved along this movement route on a play sheet 202 showing an image acquired by the image of the guide sheet 180 used in the programming operations being enlarged (similar image). Also, the target device 200 has the function section including a light emission section which emits light, an audio section which outputs audio, a vibration section which vibrates the target device 200 by self-generated vibration, an imaging section which captures an image of an object around the target device 200, a microphone which recognizes the user's voice, and one of various sensors including a voice sensor which recognizes sound inputted from the microphone and an illuminance sensor which detects an illuminance level around the target device 200. The control section of the target device 200 moves the target device 200 to a position corresponding to an area 102 having a programming block 140 placed thereon in accordance with programs stored in the storage section and then controls one of the above-described sections of the function section so as to cause the target device 200 to perform a function operation set in the programming block 140 at that position.

Note that the target device 200 of the present embodiment is not limited to the device shown in FIG. 1 which runs on the ground, and may be any device as long as it moves within a specific plane. For example, it may be an air vehicle such as a drone which moves at a constant altitude, a waterborne vehicle which moves on water, or a submersible vehicle which moves at a constant water depth. Here, in the case where the target device 200 is an air vehicle or a submersible vehicle, the target device 200 ascends to the constant altitude from the ground or goes under water to the constant depth at the start point of a movement route and descends to the ground or floats to the surface at the end point of the movement route.

Also, in the case where application software that is performed in a mobile terminal or an information and communication device has been adopted as a target device 200, the operating state of the above-described object (such as a character, an item or the like on a game screen) is controlled in a virtual space achieved by the application software, whereby the object moves in an arbitrary route or performs an arbitrary function in the virtual space.

(Programming Operations, Program Generation, and Execution Method)

Next, programming operations, program generation, and an execution method (programming method) for the programming educational device of the present embodiment are described.

Figure 4:
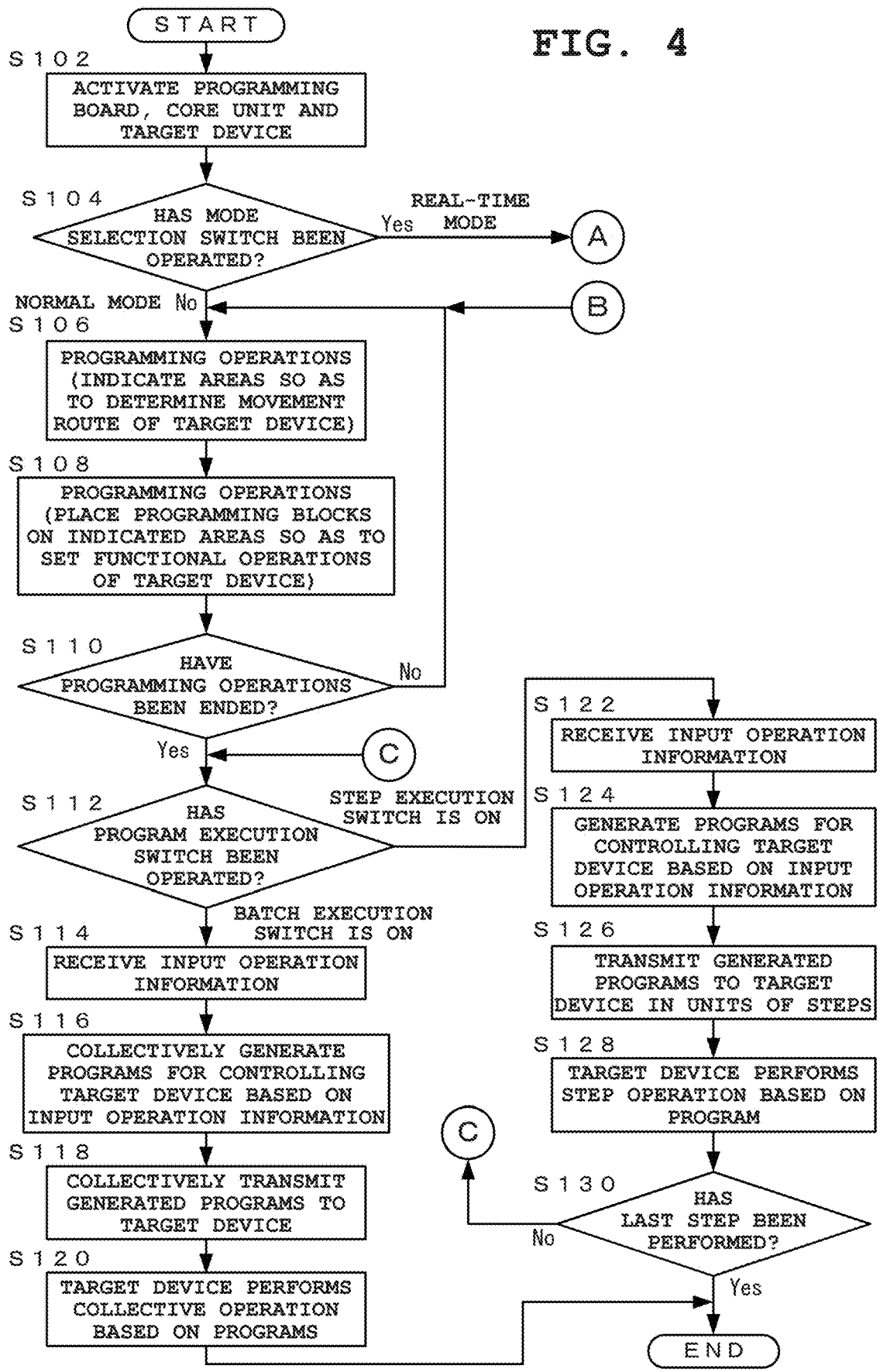
FIG. 4 is a flowchart showing an example (normal mode) of a procedure including programming operations, program generation, and an execution method in the programming educational device according to the present embodiment.
Figure 5:
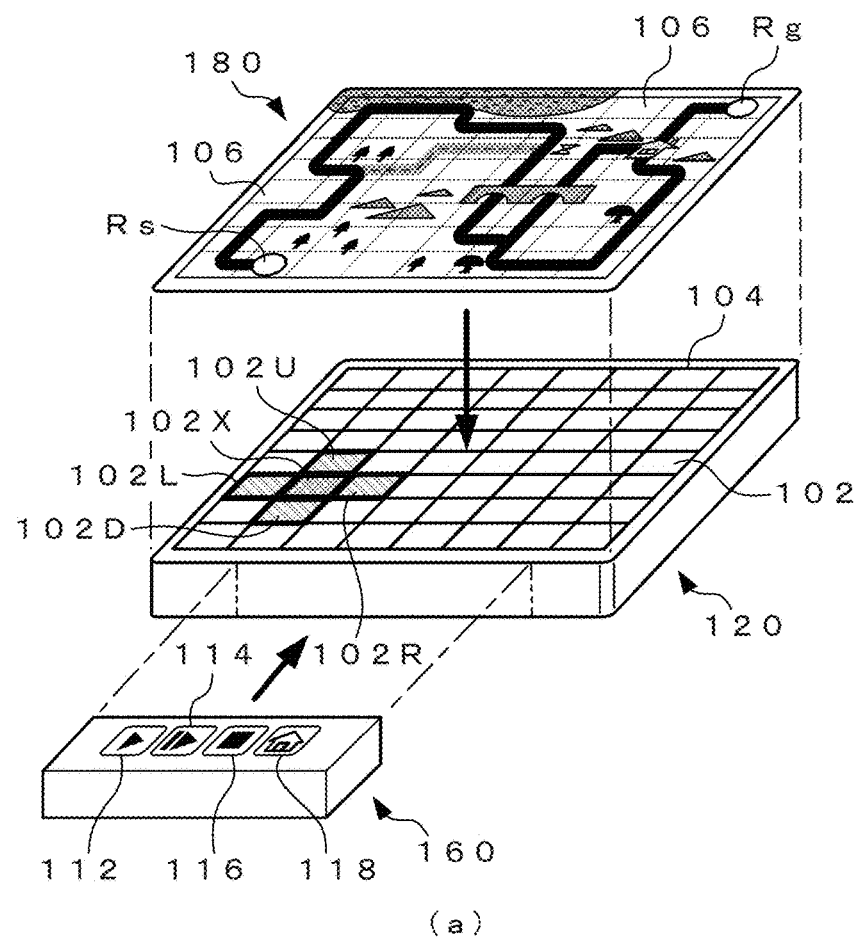
FIG. 5 is a first schematic diagram for describing programming operation processing applied in the present embodiment.
Figure 5:
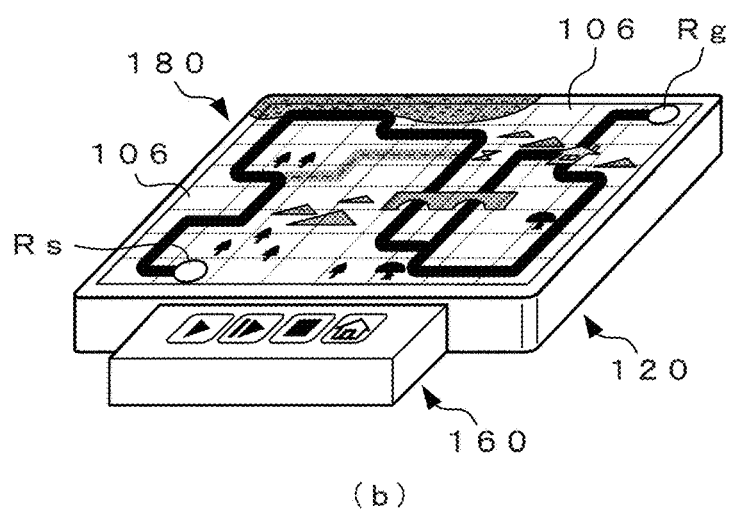
Figure 6:
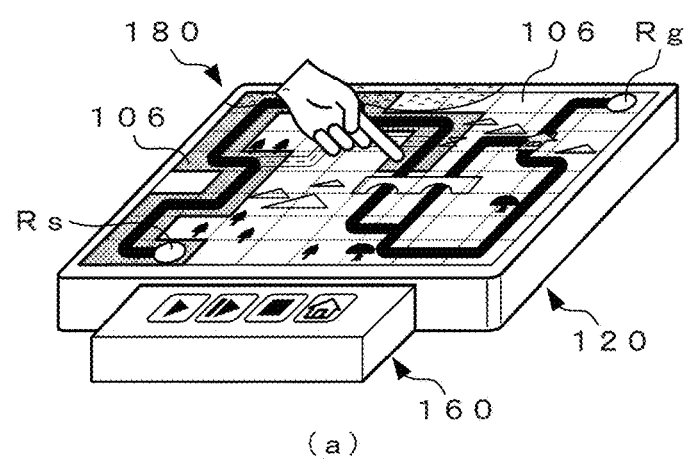
FIG. 6 is a second schematic diagram for describing the programming operation processing applied in the present embodiment.
Figure 6:
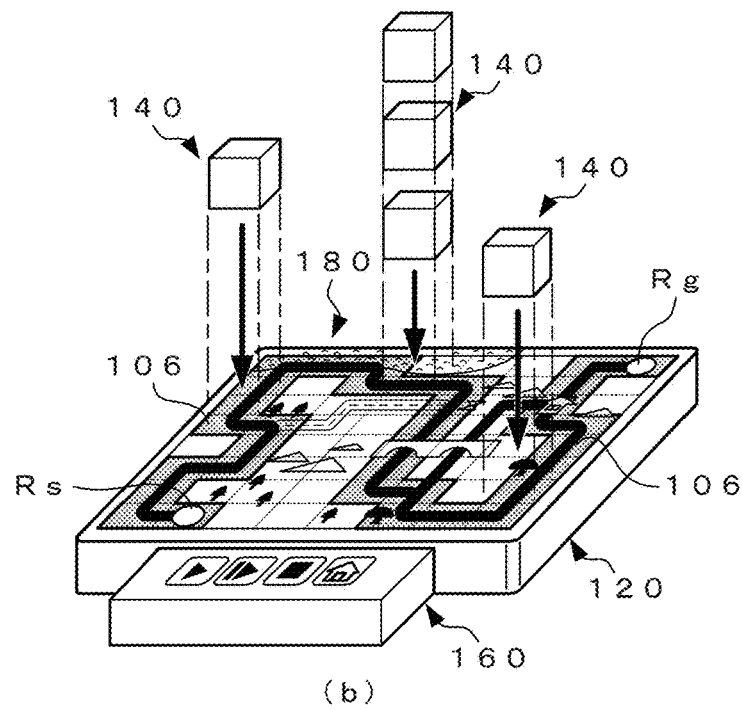
Figure 6:
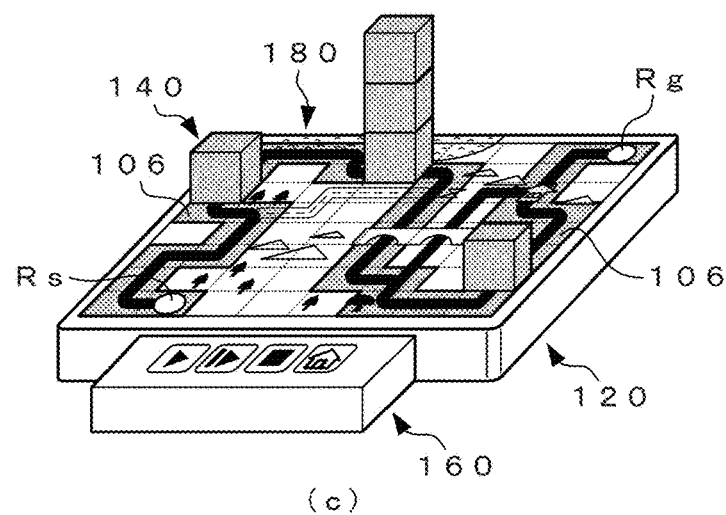
Figure 7:
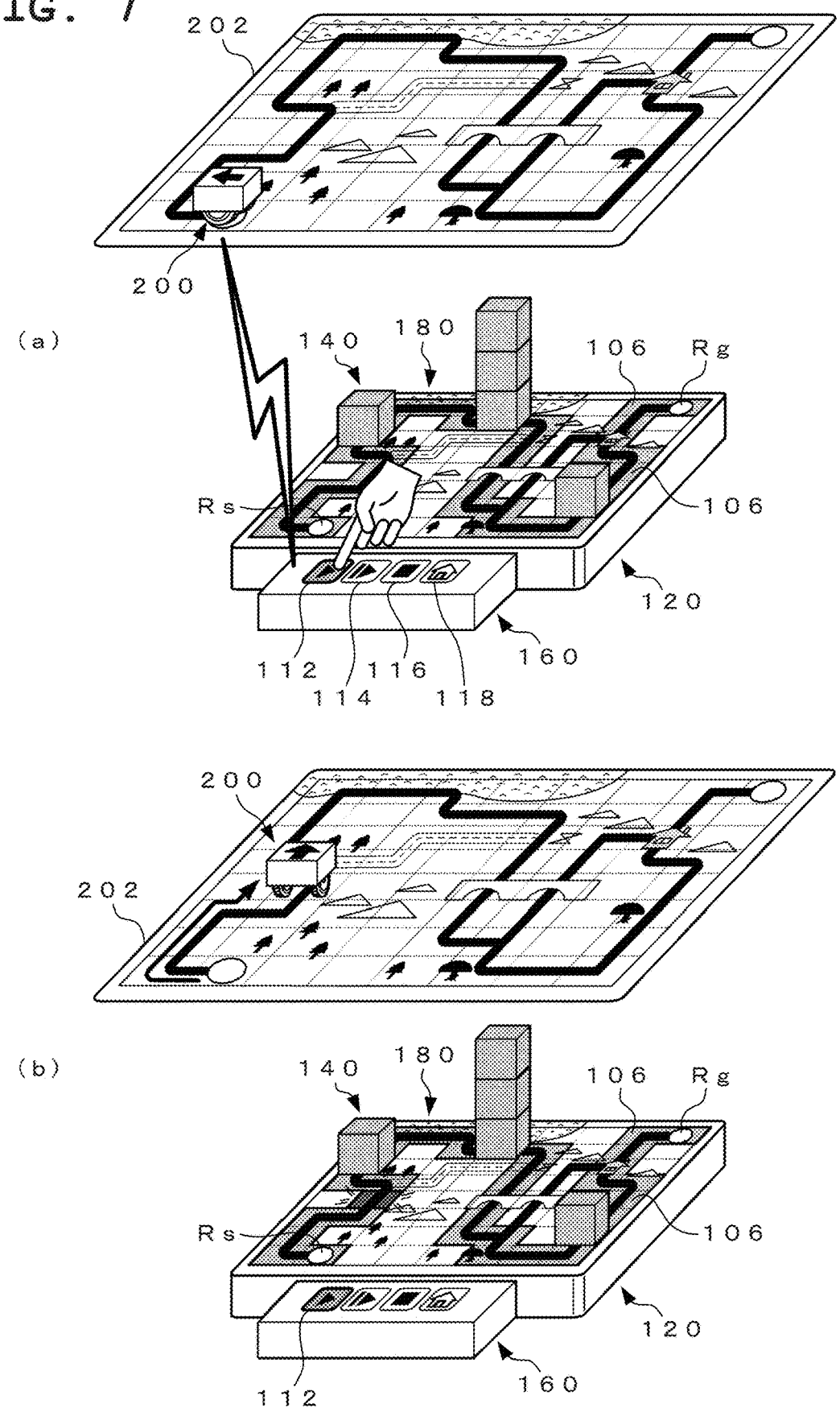
FIG. 7 is a first schematic diagram for describing program generation and execution processing (batch processing) applied in the present embodiment.
Figure 8:
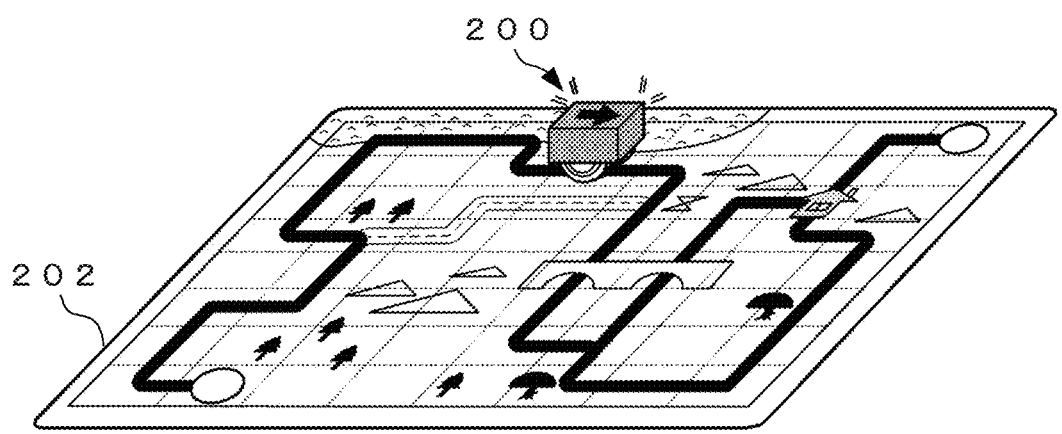
FIG. 8 is a second schematic diagram for describing the program generation and the execution processing (batch processing) applied in the present embodiment.
Figure 8:
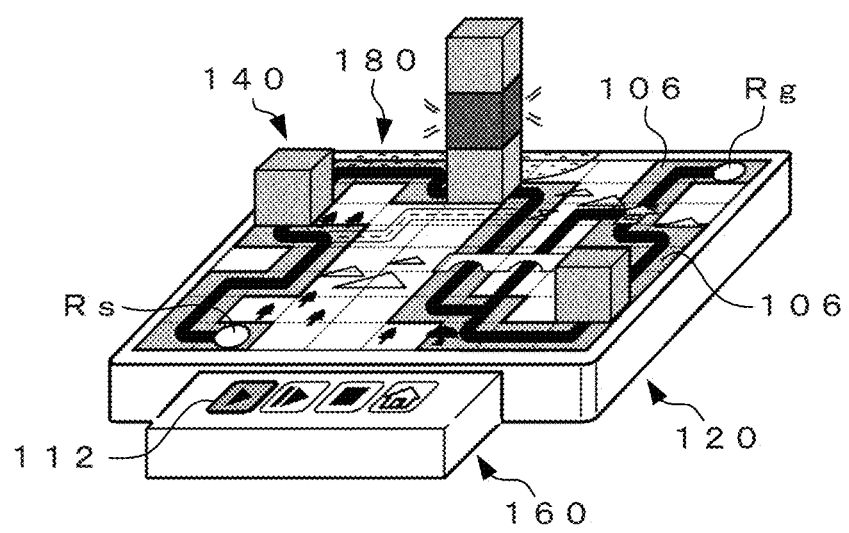
Figure 9:
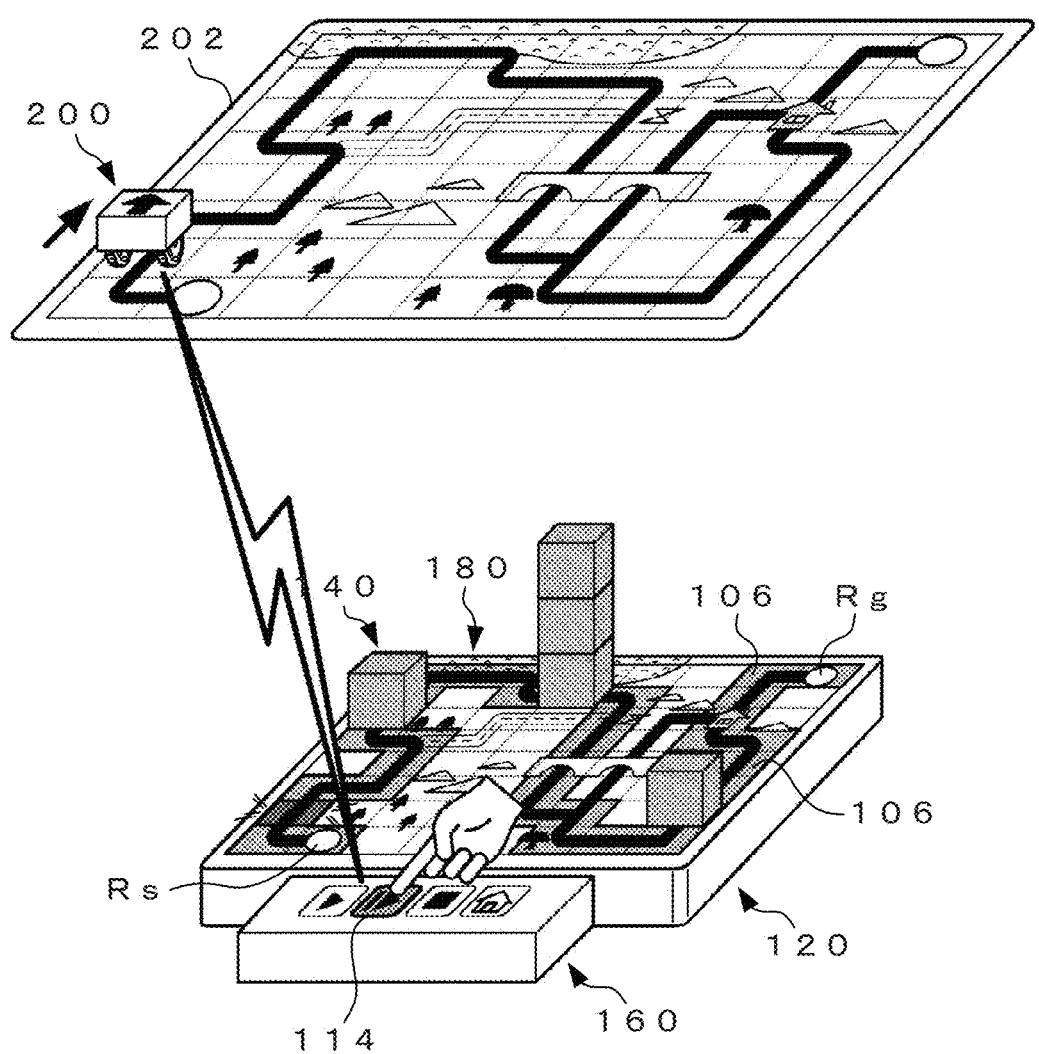
FIG. 9 is a first schematic diagram for describing program generation and execution processing (step processing) applied in the present embodiment.
Figure 10:
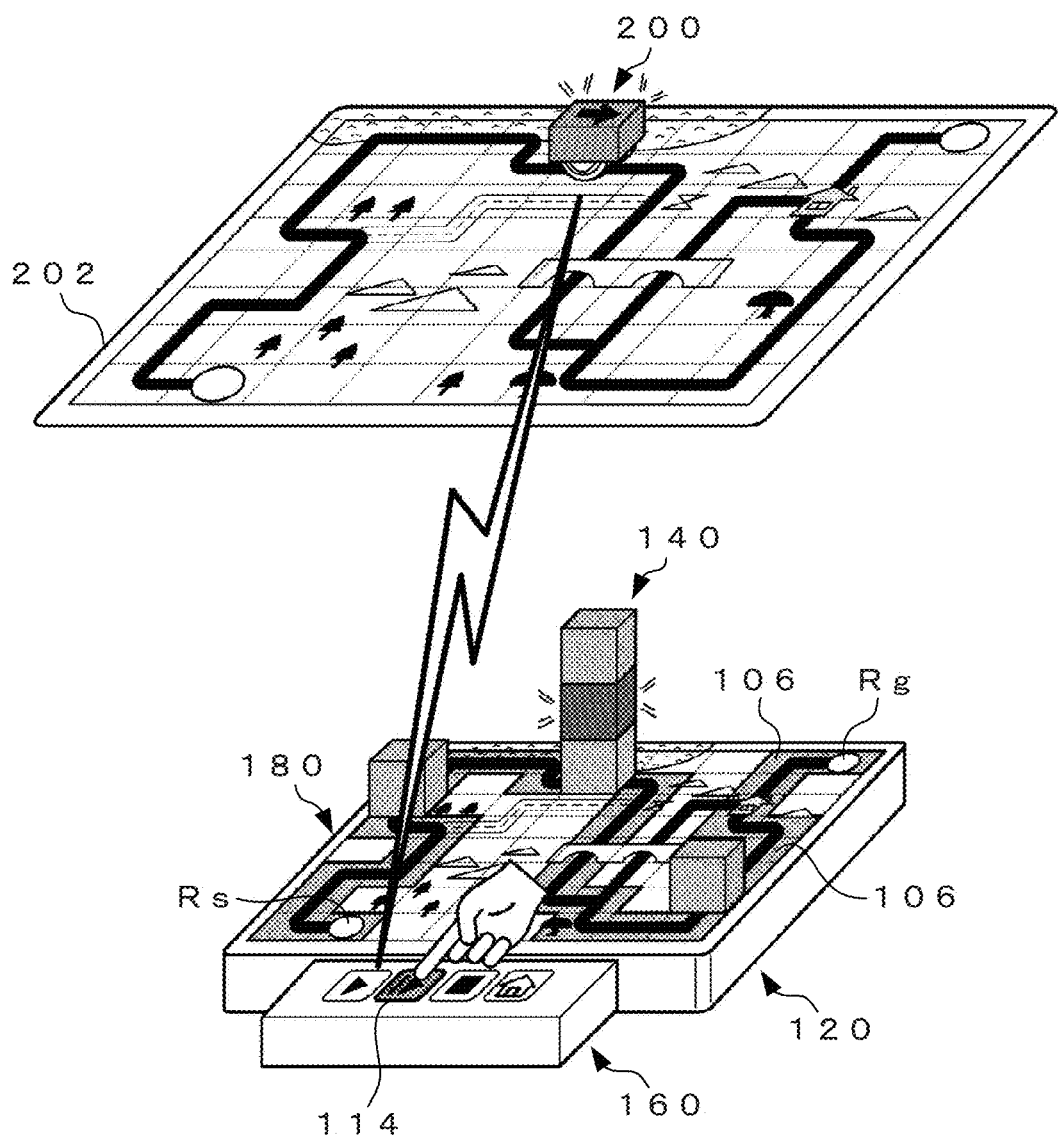
FIG. 10 is a second schematic diagram for describing the program generation and the execution processing (step processing) applied in the present embodiment.

FIG. 4 is a flowchart showing an example (normal mode) of a procedure including the programming operations, the program generation, and the execution method (programming method) for the programming educational device of the present embodiment. Also, FIG. 5 and FIG. 6 are schematic diagrams for describing programming operation processing applied in the present embodiment. FIG. 7 and FIG. 8 are schematic diagrams for describing program generation and execution processing (batch processing) applied in the present embodiment, and FIG. 9 and FIG. 10 are schematic diagrams for describing program generation and execution processing (step processing) applied in the present embodiment. Note that a processing operation (Step S104) related to mode switch setting in the flowchart of FIG. 4 will be described in detail in modification example 1 described later, and therefore explanations therefor are applicably omitted in the present embodiment.

In the programming operations, the program generation, and the execution method for the programming educational device of the present embodiment, programming operation processing by an input operation using the programming board 120, the programming blocks 140, and the guide sheet 180, program generation processing based on input operation information by use of the programming board 120 and the core unit 160, and program execution processing using the core unit 160 and the target device 200 are principally performed. Each of these control processing of the programming educational device is actualized by each control section provided in the programming board 120, the programming blocks 140, the core unit 160 and the target device 200 described above executing a specific control program independently or in cooperation with one another.

(Programming Operation Processing)

In the programming operation processing by the programming educational device according to the present embodiment, first, a user activates the programming control device 100 of the programming educational device by turning on the core unit 160 with the programming board 120 and the core unit 160 being connected to each other, and turns on and activates the target device 200 (Step S102), as shown in the flowchart of FIG. 4, and FIGS. 5(a) and (b). In addition, the user attaches the guide sheet 180 such that it covers the programming area 104 of the programming board 120.

Here, in the guide sheet 180, an IC chip 182 is provided which has stored therein entire movement route information and adjacent area information described later, as shown in FIG. 2. Also, in the programming board 120, an IC chip reading section 184 is provided which reads out adjacent area information stored in the IC chip 182 of the guide sheet 180. This IC chip reading section 184 reads out data stored in IC chip 182 by using a communication method such as near field communication. When the programming board 120 is turned on and the guide sheet 180 is attached to the programming board 120, entire movement route information and adjacent area information which are unique information of this guide sheet 180 stored in its IC chip 182 are read out by the IC chip reading section 184 of the programming board 120 and stored in the storage area of the storage section 128 by control by the control section 132 of the programming board 120.

Next, the programming operation processing is performed using the programming board 120 having the guide sheet 180 attached thereon and the programming blocks 140. Specifically, first, the user touches or depresses a plurality of partitions 106 (that is, a plurality of areas 102 of the programming area 104) corresponding to a movement route where the target device 200 is operated and thereby sequentially indicates these partitions 106, with reference to images drawn on the guide sheet 180 attached to the programming board 120, as shown in FIG. 6(a). Here, in order to determine a movement route of the target device 200, the user sequentially indicates two or more adjacent partitions 106 including a start point (start) Rs and an end point (goal) Rg on the guide sheet 180 in order of the movement of the target device 200.

Here, the above-described entire movement route information and adjacent area information are described in detail. In the present embodiment, the plurality of areas 102 of the programming area 104 are two-dimensionally arranged in a matrix direction and any two areas 102 successively arranged in an arrangement direction (row direction or column direction) are regarded as being adjacent to each other. Note that these two areas 102 adjacent to each other may be positioned away from each other at an interval equal to or less than a threshold value that is determined as required. The above-described entire movement route information is information for identifying relative positions of two or more areas 102 corresponding to two or more successive partitions 106 including a start point Rs and an end point Rg, in the programming area 104 of the programming board 120. Also, the above-described adjacent area information is information indicating whether two areas 102 among the plurality of areas 102 are adjacent to each other. The entire movement route information and the adjacent area information are stored in, for example, the storage area of the storage section 128 of the programming board 120. Here, the entire movement route information and the adjacent area information in the storage area may be data stored in the IC chip 182 of the guide sheet 180 and read out by the IC chip reading section 184. Also, a configuration may be adopted in which a plurality of adjacent area information are stored in advance in the storage area of the storage section 128 of the programming board 120, and adjacent area information corresponding to the type of an attached guide sheet 180 is selected by a user operation. As described later in detail, the entire movement route information and the adjacent area information stored in the IC chip 182 of the guide sheet 180 are information for specifying a virtual route that defines a movement route of the target device 200.

In the present embodiment, adjacent areas of a target area 102 serving as a reference (which is referred to as "102X" for convenience of description) are four areas 102L, 102R, 102U and 102D, which are an area 102L arranged one area to the left side in the row direction, an area 102R arranged one area to the right side, an area 102U arranged one area above in the column direction, and an area 102D arranged one area below, as shown in FIG. 5(a). Information for identifying this target area 102X, and information associated therewith for identifying the four adjacent areas 102L, 102R, 102U and 102D are stored in the storage area of the storage section 128 of the programming board 120 as adjacent area information. This information for identifying each area 102 includes information regarding the relative position of each area 102 in the programming area 104 of the programming board 120. Specifically, it may be a numerical value that identifies in which column and row each area 102 is located relative to the leftmost column and the uppermost row of the programming board 120. However, this is merely an example.

Note that areas to be taken as adjacent areas of a target area 102X from among the plurality of areas 102 can be arbitrarily set in accordance with the purpose of learning programming. For example, in addition to the above-described four areas 102L, 102R, 102U and 102D, closest four areas 102 arranged along diagonal directions (in the 45-degree directions) intersecting with the arrangement directions with reference to the target area 102X may be taken as adjacent areas 102 of the target area 102X.

Here, in the present embodiment, the plurality of areas 102 have been arranged over the entire programming area 104 of the programming board 120 in the row and column directions. However, the user does not always allow all the areas 102 to receive programming operations when the guide sheet 180 is attached.

More specifically, the user allows programming operations to be performed only on a plurality of areas 102 positioned right under a plurality of partitions 106 showing a black line indicating a virtual course on the guide sheets 180 as shown in FIG. 5(b), and allows no programming operations to be performed on the other areas 102. Here, in a case where one of the four areas 102 (eight areas when including diagonal direction) adjacent to the target area 102X which is an area (instruction prohibited area) where no programming operation is allowed, this instruction prohibited area is judged as an area that is not adjacent to the target area 102X. More specifically, adjacent area information corresponding to the target area 102X is configured not to include information corresponding to this instruction prohibited area. Note that areas other than instruction prohibited areas, that is, areas where programming operations are allowed are referred to as "instruction allowable areas" for convenience. Here, an example is described using the start point Rs. First, no area 102 exists below an area 102 corresponding to the partition 106 of the start point Rs in the column direction. In addition, on an adjacent area 102 located to the right in the row direction and an adjacent area 102 located above in the column direction, no black line for indicating a virtual route has been drawn. Therefore, these three areas 102 are not included in the adjacent area information of the area 102 corresponding to the start point Rs. Accordingly, it is only required that information for identifying one area 102 corresponding to the start point Rs and information for identifying one adjacent area 102 (the area 102L in a case where the area 102 corresponding to the partition 106 of the start point Rs is "102X") located to the left in the row direction are included as the adjacent area information of the area 102 corresponding to the start point Rs.

The control section 132 of the programming board 120 judges whether an area 102 where an input operation by the user has been detected by the corresponding instruction detection section 122 is an area where programming operations are allowed. More specifically, when an area is to be indicated for the first time as the start of a programming operation, only a programming operation on one area 102 corresponding to a start point Rs based on entire movement route information is allowed. Accordingly, when an area is to be indicated for the first time, programming operations on any area 102 not corresponding to the start point Rs are judged as invalid. In that case, control is performed in which, by a speaker or a display section in the programming board 120 which is not shown in the drawing, an error message such as "not programmable area" is outputted, or the light emission section of that area 102 is controlled not to emit light or controlled to emit light in a light emission color and a light emission pattern different from those of normal light emission.

When a programming operation on the area 102 corresponding to the start point Rs is performed by the user, the control section 132 of the programming board 120 waits for a programming operation to be performed on one of the areas 102 included in the adjacent area information of the area 102 corresponding to the start point Rs. Then, when a programming operation on one of the areas 102 included in the adjacent area information is performed, the control section 132 of the programming board 120 further waits for a programming operation to be performed on another area 102. When a programming operation is performed on an area 102 not included in the adjacent area information, the control section 132 outputs an error message. The control section 132 of the programming board 120 receives programming operations as described above until when an instruction on an area 102 corresponding to an end point Rg is detected by the corresponding instruction detection section 122. Then, when an instruction on the area 102 corresponding to the end point Rg and instructions on all areas 102 indicated by the entire movement route information are detected by the corresponding instruction detection sections 122, or a judgment is made that programming operations have been ended by a predetermined operation, the control section 132 outputs a message such as "programming is completed" by the speaker or the display section.

As a result, areas 102 of the programming area 104 corresponding to partitions 106 are indicated via the guide sheet 180, whereby a virtual course (start point Rs→end point Rg) corresponding to an entire movement route of the target device 200 is determined (Step S106), as shown in FIG. 6(b). Here, the control section 132 of the programming board 120 acquires indicated position information of each indicated area 102 detected by the corresponding instruction detection section 122 and sequential order information regarding the order of these instructions, and stores them in the storage area of the storage section 128. In addition, the control section 132 causes the identification alteration section 124 of each indicated area 102 to emit light in a predetermined light emission state or to change a displayed image, and thereby alters them to be visually distinguishable (In FIG. 6(a), they are drawn with a halftone color for convenience).

Here, in the structure where the identification alteration sections 124 have light emission sections, the control section 132 continues (maintains) an operation of causing the light emission section of each indicated area 102 to constantly emit light (lighting) with a predetermined light emission color and a predetermined light emission intensity, change the light emission color, or emit light with a predetermined light emission pattern (flashing), as shown in FIG. 6(a). Also, during the programming operations, when a program confirmation switch (omitted in the drawing) or the like provided on the operation section 162 of the core unit 160 is operated or no programming operation is performed for a predetermined amount of time or when a trigger condition on a time interval given in advance or set by a user operation is satisfied, the control section 132 causes the light emission sections of each of the areas 102 to sequentially emit light by time sharing according to the movement route order already determined as a result of instructions by programming operations. As such, by an altered state (which is a light emitting state in this case) of the identification alteration section 124 of each indicated area 102 being maintained or a predetermined alteration state being shown with a predetermined condition as a trigger, the contents and progress status of programming operations, the movement route determined up to a current point by programming operations, the sequence of movements of the target device 200 and the like can be visually grasped and easily understood.

Also, in addition to the above-described case where a programming operation is performed on an instruction prohibited area, when an anomaly occurs in the operation of the programming control device 100, the control section 132 performs control of outputting an error message such as "operation error" by the speaker or the display section, causing the light emission section of this area 102 not to emit light, or causing the light emission section to emit light in a light emission color and a light emission pattern different from those of normal light emission. As a result, the user is notified of errors or the like in programming operations. Also, in the structure where the programming board 120 has audio sections and/or vibration sections, the control section 132 may give a notification regarding an error or the like in a programming operation by changing the amplitude, frequency and pattern of sound or vibration in the corresponding audio section and/or vibration section, in addition to or in place of the above-described light emission operation of the corresponding light emission section.

Next, on a partition 106 where a specific function operation is to be performed by the target device 200 among the plurality of partitions 106 (indicated areas 102) serving as the above-described virtual course, the user places a programming block 140 where this function operation has been set, as shown in FIGS. 6(b) and (c). In a case where the target device 200 is caused to perform two or more function operations at a specific position, a plurality of programming blocks 140 where these function operations have been set are stacked on a partition 106 at that position as multi-tiered blocks. In this case as well, when a programming operation is performed on an instruction prohibited area, the control section 132 of the programming board 120 performs the above-described error processing as required.

As a result, the function operations for the target device 200 are set (Step S108). Here, the control section 132 of the programming board 120 acquires the block position information of each programming block 140 detected by the corresponding block I/F section 126 and its function information via the guide sheet 180 and stores them in the storage area of the storage section 128. Moreover, the control section 148 of each programming block 140 placed by the user causes its identification alteration section 144 to emit light in a predetermined light emission state or changes an image displayed thereon so as to alter each programming block 140 to be visually distinguishable (In FIG. 6(a), they are drawn with a halftone color for convenience).

Here, in the structure where each identification alteration section 144 has a light emission section, each control section 148 continues (maintains) an operation of, for example, causing the light emission section of the corresponding programming block 140 to constantly emit light (lighting) with a predetermined light emission color and a predetermined light emission intensity, change the light emission color, or emit light with a predetermined light emission pattern (flashing), as shown in FIG. 6(c). Also, during the programming operations, when the program confirmation switch (omitted in the drawing) or the like provided on the operation section 162 of the core unit 160 is operated or no programming operation is performed for a predetermined amount of time or when a trigger condition on a time interval given in advance or set by a user operation is satisfied, each control section 148 causes the light emission section of the corresponding programming block 140 to sequentially emit light by time sharing in the order of the function operations already set as a result of placement by programming operations. As such, by an altered state (which is a light emitting state in this case) of the identification alteration section 144 in each programming block 140 being maintained or a predetermined alteration state being shown with a predetermined condition as a trigger, the contents and progress status of programming operations, function operations already set by the programming operations, the order of the function operations and the like can be visually grasped and easily understood.

Also, in addition to the above-described case where a programming operation is performed on an instruction prohibited area, when a judgment is made that a programming block 140 has been placed on a placement prohibited area set in advance or when an anomaly occurs in the operation of the programming control device 100, each control section 148 performs control of causing the light emission section of the corresponding programming block 140 not to emit light, outputting a predetermined error message by the speaker or the display section, or causing the light emission section to emit light in a light emission color and a light emission pattern different from those of normal light emission. As a result, the user is notified of errors or the like in programming operations. Also, in the structure where each programming block 140 has an audio section and/or a vibration section, each control section 148 may give a notification regarding an error or the like in a programming operation by changing the amplitude, frequency, and pattern of sound or vibration in the corresponding audio section and/or vibration section, in addition to or in place of the above-described light emission operation of the corresponding light emission section. Note that the placement prohibited area herein may be arbitrarily set in accordance with the purpose of learning programming. For example, an area 102 corresponding to a partition 106 showing a picture of a tunnel in FIG. 6(a) may be set as a placement prohibited area. The information of this placement prohibited area is also included in the above-described adjacent area information.

In the present embodiment, until when the user determines a virtual course corresponding to an entire movement route of the target device 200, sets all function operations thereon, and ends programming operations, the above-described Steps S106 and S108 are repeatedly performed (No at Step S110). More specifically, when an instruction on the area 102 corresponding to the partition 106 of the end point Rg stored in the storage section 128 of the programming board 120 and instructions on all the areas 102 indicated by the entire movement route information are detected by the instruction detection section 122, the control section 132 of the programming board 120 judges that the programming operations have been ended.

Note that the programming operations shown in Steps S106 and S108 may be operations of sequentially setting function operations for the target device 200 while gradually determining a movement route of the target device 200, or may be operations of setting all function operations for the target device 200 after determining an entire movement route of the target device 200. In a case where only an operation of moving the target device 200 on a predetermined route is set and no specific function operation is set, the above-described programming operation at Step S108 for placing programming blocks 140 on the guide sheet 180 is omitted.

Then, in a state where the programming operation processing using the programming board 120 and the programming blocks 140 has been ended as shown in FIG. 6(c), the control sections 132 and 148 maintain altered states of the identification alteration sections 124 of the indicated areas 102 corresponding to the total movement route determined by the programming operations and altered states of the identification alteration sections 144 of the programming blocks 140 setting all the function operations, or show these altered states with a specific condition as a trigger, as shown in the above-described Steps S106 and S108. As a result, the entire movement route of the target device 200 determined by the programming operations, the sequence of the movements, all the function operations, the sequence of the operations and the like can be visually grasped and easily understood.

When the above-described programming operation processing is ended (Yes at Step S110), a waiting state is set in which program generation processing using the programming board 120 and the core unit 160 can be performed.

Then, when the user operates a program execution switch (the batch execution switch 112 or the stepwise execution switch 114) provided on the operation section 162 of the core unit 160 (Step S112), program batch generation and execution processing at Steps S114 to S120 or program step generation and execution processing at Steps S122 to S130 are performed, as shown in FIG. 7(a).

(Program Batch Generation and Execution Processing)

At the above-described Step S112, when the user performs an ON operation on the batch execution switch 112 provided on the core unit 160 as shown in FIG. 7(a), program batch generation and execution processing are performed. In the program batch generation and the execution processing, first, the control section 170 of the core unit 160 transmits a control signal to the control section 132 of the programming board 120, and collectively receives input operation information including the indicated position information, the sequential order information, the block position information and the function information acquired by the above-described programming operation processing from the programming board 120 (Step S114).

Next, the control section 170 collectively generates programs including commands for controlling the operating state (movement and function operation) of the target device 200, with the input operation information received from the programming board 120 as source codes (Step S116). The programs generated in the control section 170 are stored in the storage area of the storage section 166 of the core unit 160.

Next, the control section 170 transmits the generated programs collectively to the target device 200 via the communication I/F section 168, as shown in FIG. 7(*a*) (Step S118). Subsequently, by executing the transmitted programs, the target device 200 performs a collective operation of sequentially moving along the entire movement route on the play sheet 202 which corresponds to the virtual route extending from the start point Rs to the end point Rg determined in the above-described programming operation processing using the programming board 120, as shown in FIG. 7(*b*) and FIG. 8 (Step S120). Then, after the collective operation, the series of processing operations related to the programming operations, the program generation, and the execution method shown in the flowchart of FIG. 4 is ended.

In the above-described collective operation, the control section 170 of the core unit 160 receives, as needed, information regarding the execution status (which is a current position of the target device 200, a currently executing function, data as to whether the target device 200 is moving and performing a function as programmed) of a program from the target device 200 as program execution information via the communication I/F section 168, and transmits it to the control section 132 of the programming board 120. Then, based on the program execution information received from the core unit 160, the control section 132 of the programming board 120 causes an area 102 corresponding to a current position of the target device 200 on the play sheet 202 to emit light in a light emission state different from those of the other indicated areas 102 determined by the programming operations, or changes an image displayed thereon so as to alter the area 102 to be visually distinguishable (in FIG. 7(*b*), it is drawn with a dark halftone color for convenience), as shown in FIG. 7(*b*).

Also, in a case where the target device 200 has been moved to a position where one or a plurality of function operations has been set by the programming operations and is performing this function operation as shown in FIG. 8, a programming block 140 corresponding to this function operation currently being performed by the target device 200 is caused to emit light in a light emission state different from those of the other programming blocks 140 or caused to change a displayed image by the control section 148 of the programming block 140 so as to alter the programming block 140 to be visually distinguishable, based on the program execution information received from the target device 200. Here, in a case where a plurality of programming blocks 140 have been stacked and therefore a plurality of function operations have been set as shown in FIG. 8, the control sections 148 causes the programming blocks 140 to sequentially emit light in the order in which the function operations are performed. In FIG. 8, as a function operation of the target device 200 set in the second block of the three-tiered programming blocks 140, the emission of light having a specific light emission color has been performed. This programming block 140 corresponding to the function operation is drawn with a dark halftone color for convenience.

In the present embodiment, the core unit 160 performs communication with the target device 200 as required, receives program execution information regarding the execution status of a program in the target device 200, and alters (for example, lights up) an area 102 of the programming board 120 or a programming block 140 corresponding to a current position of the target device 200 based on the program execution information so that the area 102 or the programming block 140 becomes distinguishable. However, the present invention is not limited thereto. For example, a configuration may be adopted in which, based on an elapsed time from the end of the transmission of a program to the target device 200 or from the start of the program in the target device 200 (that is, without communication being performed with the target device 200), the core unit 160 infers the execution status of the program in the target device 200 and alters an area 102 of the programming board 120 or a programming block 140. In this configuration, the core unit 160 performs communication with the target device 200 at intervals, at each predetermined position, or based on each condition so that a large difference between the inference by the core unit 160 and the actual execution status of the program does not occur.

Here, in a case where the identification alteration section 124 of the programming board 120 and the identification alteration sections 144 of the programming blocks 140 all have light emission sections, the control section 132 of the programming board 120 and the control sections 148 of the programming blocks 140 control their light emission statuses as the following examples so that the execution status of the program in the target device 200 becomes visually distinguishable and is easily grasped.

First, as shown in the example in FIG. 7(*a*), the control sections 132 and 148 maintain a state where the light emission sections of indicated areas 102 corresponding to an entire movement route determined by programming operations and the light emission sections of programming blocks 140 corresponding to all function operations continuously emit light in a predetermined light emission color and with a predetermined light emission intensity. Then, based on program execution information, the control sections 132 and 148 cause the light emission section of an area 102 corresponding to the current position of the target device 200 and the light emission section of a programming block 140 corresponding to the current function operation of the target device 200 to emit light in a light emission color different from those of the other indicated areas 102 and programming blocks 140 and with a higher light emission intensity or a different light emission pattern (for example, flashing), as shown in FIG. 7(*b*) and FIG. 8.

Also, in another configuration, the control sections 132 and 148 causes the light emission section of an area 102 corresponding to the current position of the target device 200 and the light emission section of a programming block 140 corresponding to the current function operation of the target device 200 to emit light in a predetermined light emission color with a predetermined light emission intensity and cause the light emission sections of the other indicated areas 102 and programming blocks 140 not to emit light (the lights are turned off).

In yet another configuration, in all the identification alteration sections 124 of the areas 102 of the programming board 120 and all the identification alteration sections 144 of the programming blocks 140, a first light emission section for expressing a status at the time of programming operation and a second light emission section for expressing a status at the time of program execution are separately provided. Then, in an area 102 corresponding to the current position of the target device 200 and a programming block 140 corresponding to the current function operation of the target device 200, both of the first and second light emission sections emit light. In the other indicated areas 102 and programming blocks 140, only the first light emission sections emit light.

Also, when an error or a bug occurs in a program being executed in the target device 200, the control sections 132 and 148 perform control such that an area 102 or a programming block 140 where the error or the bug has occurred emit light using a light emission color and a light emission pattern different from those of the above-described normal execution state, based on program execution information received from the target device 200. As a result, the user is notified of the anomaly at the time of the program execution. Note that the error or the bug herein refers to, for example, a case where a command to perform image capturing has been given in spite of the fact that the target device 200 has no imaging section or a case in which in spite of the fact that the target device 200 is being blocked by an obstacle which had not been expected at the time of programming operations but is located in the traveling direction, a command to move in the direction of the obstacle has been given.

(Program Step Generation and Execution Processing)

At the above-described Step S112, when the user performs an ON operation on the stepwise execution switch 114 provided on the core unit 160 as shown in FIG. 9, program step generation and execution processing are performed. In the program step generation and the execution processing, first, the control section 170 of the core unit 160 transmits a control signal to the control section 132 of the programming board 120 and receives, from the programming board 120, the input operation information acquired by the programming operation processing collectively or for each one programming operation (one step) (Step S122).

Next, based on the received input operation information, the control section 170 generates programs including commands for controlling the operating state (movement and function operation) of the target device 200 collectively or for each one programming operation (Step S124). The programs generated by the control section 170 are stored in the storage area of the storage section 166 of the core unit 160. Note that the "one programming operation" herein refers to an operation of indicating one area 102 or an operation of placing one programming block 140, and the "one step" in the program step generation and the execution processing in the present embodiment refers to a group of "steps" specified by this one operation. In a case where a plurality of programming blocks 140 have been stacked as multi-tiered blocks and an instruction to simultaneously perform a plurality of functions specified by these programming blocks 140 has been given, "steps" of simultaneously performing these functions are taken as one step.

Next, the control section 170 transmits each generated program corresponding to one operation individually to the target device 200 via the communication I/F section 168, as shown in FIG. 9, (Step S126). Then, by executing a transmitted program corresponding to one operation, the target device 200 performs a step operation of moving by an amount equal to one operation along the movement route on the play sheet 202 which corresponds to the virtual course determined in the above-described programming operation processing, or performing a function corresponding to one operation (Step S128).

Here, the control section 170 of the core unit 160 transmits information regarding the program corresponding to one operation transmitted to the target device 200 (that is, information specifying the movement of the target device 200 or the function to be performed by the target device 200) to the control section 132 of the programming board 120 as program execution information. The control section 132 of the programming board 120 causes, based on this program execution information, an area 102 corresponding to the current position of the target device 200 on the play sheet 202 to emit light in a light emission state different from those of the other indicated areas 102, or changes an image displayed thereon so as to alter the area 102 to be visually distinguishable (in FIG. 9, it is drawn with a dark halftone color for convenience), as shown in FIG. 9.

Also, in a case where the target device 200 is performing a specific function operation after moving to a position where one or plurality of function operations have been set by the programming operations, the control section 148 of the programming block 140 corresponding to the function operation that is currently being performed by the target device 200 causes, based on the program execution information, the programming block 140 to emit light in a light emission state different from those of the other programming blocks 140, or changes an image displayed thereon so as to alter the programming block 140 to be visually distinguishable, as shown in FIG. 10.

Here, in a case where a plurality of programming blocks 140 have been stacked as multi-tiered blocks, function operations by the target device 200 are performed one by one and the corresponding programming blocks 140 sequentially emit light in accordance with an execution sequence set by the programming operations every time the user performs an ON operation on the stepwise execution switch 114 of the core unit 160, as shown in FIG. 10. In the case of FIG. 10, as a function operation set in the second one of the programming blocks 140 stacked as three-tiered blocks, light of a predetermined light emission color has been emitted. The programming block 140 corresponding to this function operation is drawn with a dark halftone color for convenience.

After the processing operation of Step S128, the control section 170 of the core unit 160 judges whether the step operation performed by the target device 200 at Step S128 corresponds to the last input operation information among the input operation information acquired by the programming operation processing (Step S130). That is, after the target device 200 moves to the end position of the movement route on play sheet 202, if one or a plurality of programming blocks 140 has been stacked at this end position, the control section 170 of the core unit 160 judges whether the target device 200 has performed all functions corresponding to these programming blocks 140.

When the control section 170 of the core unit 160 judges that the step operation performed by the target device 200 at Step S128 corresponds to the last input operation information (Yes at Step S130), the programming operations and the series of processing operations related to the program generation and the execution method shown in the flowchart of FIG. 4 are completed. Conversely, when judged that the step operation performed by the target device 200 at Step S128 does not correspond to the last input operation information (No at Step S130), the control section 170 proceeds to the above-described Step S112. At this Step S112, the control section 170 judges whether the user has performed an ON operation on the batch execution switch 112 provided on the core unit 160 or has performed an ON operation on the stepwise execution switch 114.

When judged that an ON operation on the batch execution switch 112 has been performed, the control section 170 of the core unit 160 performs the above-described program batch generation and the execution processing for all of the input operation information not yet subjected to the processing among the input operation information acquired by the programming operation processing (Steps S114 to S120). Then, after operations corresponding to all the input operation information are performed, the programming operations and the series of processing operations related to the program generation and the execution method shown in the flowchart of FIG. 4 are completed. Also, when judged that an ON operation on the stepwise execution switch 114 has been performed, the control section 170 of the core unit 160 performs the program step generation and the execution processing in accordance with the above-described Steps S122 to S130. Note that, in the present embodiment, the series of processing operations shown in FIG. 4 is referred to as "normal mode" for convenience.

As described above, in the present embodiment, the tangible program control device 100 constituted by the programming board 120, the programming block 140, and the core unit 160 is used, and a movement route of the target device 200 in an absolute coordinate system can be determined by programming operations of touching or depressing arbitrary areas 102 on the programming board 120 as instructions. Also, in the present embodiment, a function operation to be performed by the target device 200 at an arbitrary position of the absolute coordinate system can be set by a programming operation of placing a programming block 140 on an arbitrary area 102 on the programming board 120.

Also, in the present embodiment, during the execution of programs generated based on programming operations, or before or after the execution of programs (such as during programming operations), areas 102 on the programming board 120 which correspond to a movement route determined during programming operations, and a programming block 140 corresponding to a function operation of the target device 200 can be altered to be visually distinguishable from the other areas 102 and programming blocks 140.

Thus, according to the present embodiment, even young children can easily perform programming related to a combination of a movement and various types of function operations for the target device 200, and easily and intuitively grasp its operation contents and operating state visually. Accordingly, the learning effect of programming can be expected to be improved.

In the above descriptions of the programming operations, the program generation, and the execution method, the configuration has been described in which, after the programming operation processing (Step S110), the user operates a program execution switch (the batch execution switch 112 or the stepwise execution switch 114) provided on the operation section 162 of the core unit 160 (Step S112), and thereby transmits input operation information acquired by the programming operation processing to the core unit 160 from the programming board 120 (Step S114 and Step S122). However, the present invention is not limited thereto. For example, a configuration may be adopted in which, when input operation information is acquired in the programming board 120 during the programming operation processing, this input operation information is transmitted at any time, at predetermined timing or periodically.

Also, in the above descriptions of the programming operations, the program generation, and the execution method, the method has been described in which a movement route of the target device 200 is determined by areas 102 of the programming area 104 corresponding to the start point of the movement route to the end point being sequentially indicated. However, the present invention is not limited thereto. For example, a configuration may be adopted in which, when two areas 102 that are not adjacent to each other are temporally successively indicated in programming operations, interpolation processing is performed in which non-indicated areas 102 between these areas 102 are automatically set as indicated areas so as to determine a movement route.

More specifically, a configuration may be adopted whereby when two areas 102 that are not adjacent to each other are successively indicated in the programming area 104, interpolation processing may be set serving as the shortest distance or shortest time between the areas 102. Also, a configuration may be adopted whereby, when there is a plurality of routes and predetermined conditions (such as an optimal cost, an essential passing point and the like) for determining a movement route, an optimal route may be determined by taking these conditions into consideration. Here, the cost is a condition for setting an optimal route, which is an expense or total cost incurred when passing through each area 102 and setting the route, and the associated individual cost of each area 102 is set in advance. Such interpolation processing may be, for example, incorporated in advance into the programming operation processing that is performed by the control section 132 of the programming board 120. Alternatively, for example, an interpolation processing function may be turned on or turned off by operating an interpolation switch, which is not shown in the drawings.

In the above-described embodiment, programming operations are performed with the guide sheet 180 being attached on the programming area 104 of the programming board 120, and the target device 200 is moved on the play sheet 202 where an image similar to the guide sheet 180 is shown, as shown in FIG. 5 to FIG. 10. However, the present invention is not limited thereto, and the following configuration may be adopted.

Figure 11:
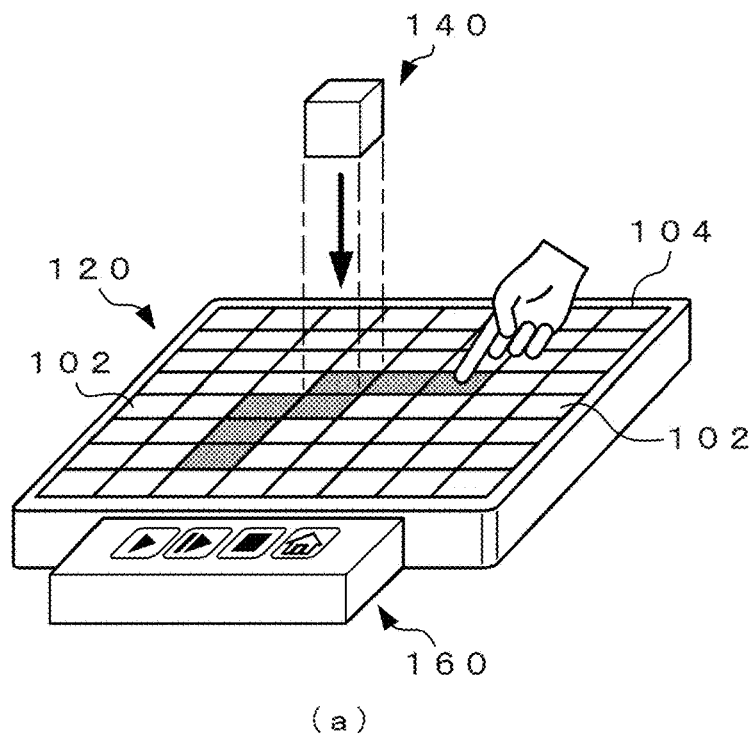
FIG. 11 is a first schematic diagram showing a configuration example of the programming educational device (programming device) according to the present embodiment which does not have a guide sheet.
Figure 11:
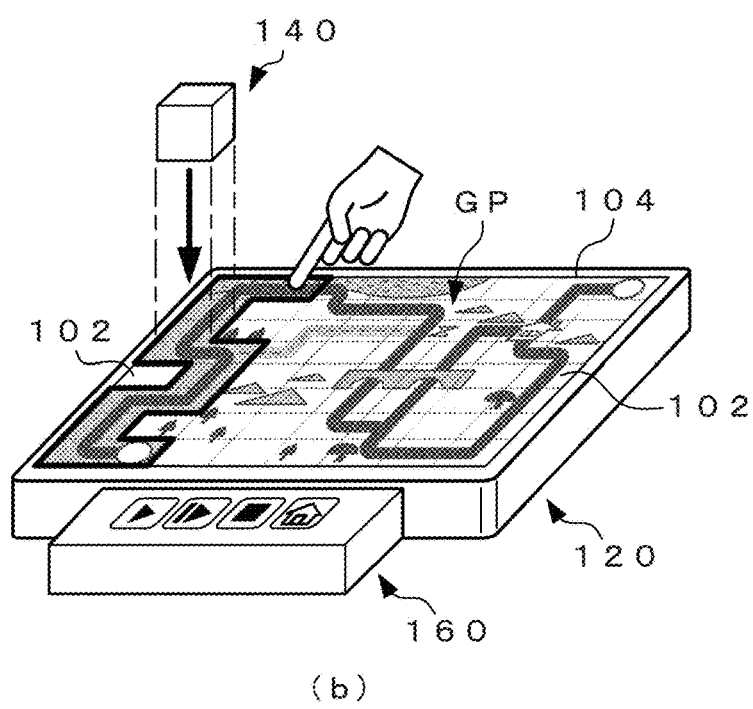
Figure 12:
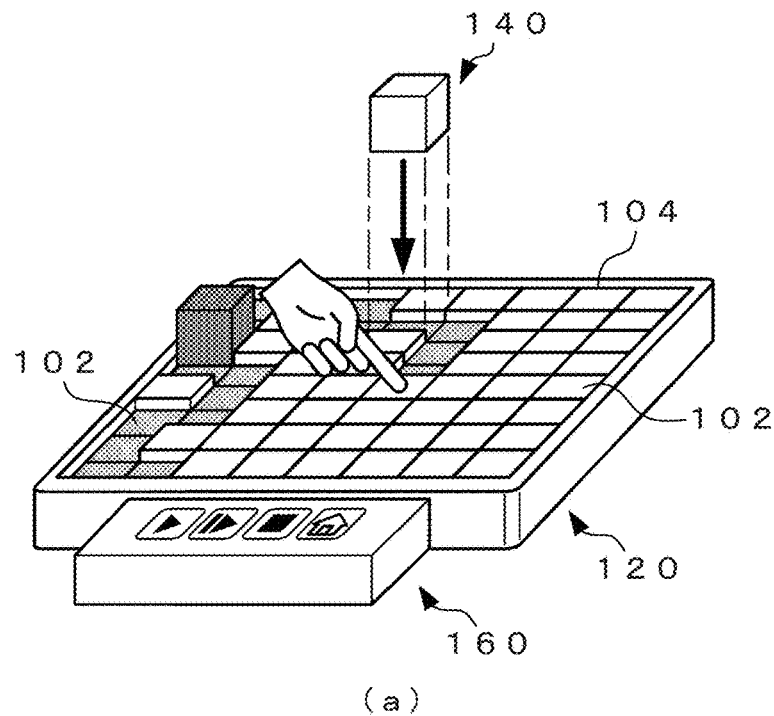
FIG. 12 is a second schematic diagram showing a configuration example of the programming educational device (programming device) according to the present embodiment which does not include any guide sheet.
Figure 12:
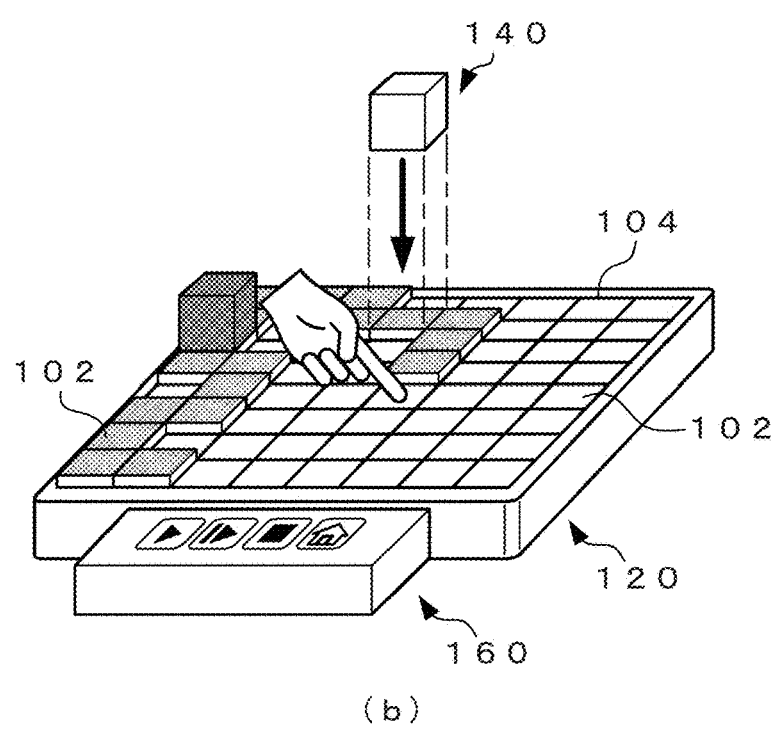

FIG. 11 and FIG. 12 are schematic diagrams showing a configuration example of the programming educational device (programming device) according to the present embodiment which does not have a guide sheet. Note that, here, descriptions of sections that are the same as those of the above-described embodiment are simplified.

That is, in the present embodiment, the programming educational device may be configured such that programming operations are performed without the guide sheet 180, or the target device 200 is operated without the play sheet 202. In this structure, while imagining a movement route of the target device and the execution statuses of function operations, the user indicates areas 102 of the programming area 104 on the programming board 120 having no guide sheet by directly touching or depressing them, and places programming blocks 140 on arbitrary areas 102 among the indicated areas 102 so as to set function operations for the target device 200, as shown in FIG. 11(a). In the drawing, the first area 102 of the programming area 104 indicated by the user corresponds to the start point of the movement route of the target device 200 and the last area 102 corresponds to the end point of the movement route. In this case, the target device 200 is moved along the movement route on the specific flat surface having no play sheet 202, in accordance with programs generated by the programming operations performed without the guide sheet 180.

Also, in the structure having no guide sheet 180, for example, a structure may be adopted in which an image similar to that on the above-described guide sheet 180 is directly drawn on the upper surface of the programming area 104 of the programming board 120. Also, a configuration may be adopted in which an image GP which is similar to that on the above-described guide sheet 180 or supports or guides programming operations is displayed on the light emission sections or display sections provided on the areas 102 as the identification alteration sections 124 or on the luminescent panel or display panel provided to be shared in the entire programming area 104, as shown in FIG. 11(b). In the configuration shown in FIG. 11 (b), by the data of the image GP or the like displayed by use of the identification alteration sections 124 being rewritten, the image GP displayed on the programming area 104 can be changed as required.

Moreover, in the structure having no guide sheet 180, for example, a structure may be adopted in which, as the instruction detection sections 122 provided corresponding to the areas 102 of the programming board 120, push switches and the like may be used which have a switch mechanism where switching between an ON state and an OFF state switches at every depression operation by a user, and the height at which its upper surface is located in the ON state is changed in relation to a height (reference height) where the upper surface of the programming area 104 is located. More specifically, by a first depression operation, each push switch enters a state (concave state) where its upper surface is positioned lower than the reference height so as to be electrically tuned on. Then, by a second depression operation, this push button reverts so that its upper surface is at the height equal to the reference height, and thereby electrically turned off, as shown in FIG. 12(a). Note that the structure of each push switch is not limited to the above-described structure where its upper surface is depressed (changes to concave state) in response to a depression operation that switches to the ON state. For example, a structure may be adopted in which its upper surface protrudes (changes convex state) in response to a depression operation so that it switches to the ON state, as shown in FIG. 12(b). By this structure where each area 102 indicated by the user is visually distinguishable, the progress of programming operations can be easily grasped. That is, in the structure shown in FIG. 12, the instruction detection sections 122 also function as the identification alteration sections 124. Note that, in this structure as well, the areas 102 of the programming board 120 may include light emission sections or display sections as the identification alteration sections 124. In that case, by the instruction detection sections 122, each indicated area 102 changes to the concave state or the convex state so as to be electrically turned on, and emits light in a predetermined light emission state or changes a displayed image.

In the above-described embodiment, programming blocks 140 are placed on indicated areas 102 on the programming area 104 of the programming board 120, whereby function operations to be performed by the target device 200 are set, as shown in FIG. 6 to FIG. 10. However, the present invention is not limited thereto, and the later-described configuration may be adopted.

In the present embodiment, in the case where programming operations are performed without using the programming blocks 140 (that is, when programming operations using the programming blocks 140 are omitted), the user successively indicates areas 102 of the programming area 104 of the programming board 120 so as to determine a virtual course that defines a movement route of the target device 200, whereby programs related only to the movement of the target device 200 are generated. That is, when only the movement of the target device 200 is to be controlled in the present embodiment, the programming blocks 140 where function operations to be performed by the target device 200 have been set are not required during programming operations.

On the other hand, in the configuration of the present invention where programming operations are performed using the programming board 120, function operations to be performed by the target device 200 can be set without the programming blocks by, for example, the detection function of the instruction detection section 122 of each area 102 on the programming board 120. More specifically, each instruction detection section 122 provided in the areas 102 of the programming area 104 detects whether the user's instruction operation (touching or depressing) has been performed on the corresponding area 102, by using its touch sensor or push switch. In the storage area of the storage section 128 of the programming board 120, information has been stored in which each instruction method and status of the user to be detected by the instruction detection sections 122 and each function operation of the target device 200 have been associated with each other. The control section 132 of the programming board 120 reads out function operations of the target device 200 stored in the storage area of the storage section 128 based on the method or status of each instruction operation performed on areas 102, and stores each function operation in the storage area of the storage section 128 in association with the indicated position information of the corresponding area 102.

Here, for the creation of the association between each instruction method and status that is detected by the instruction detection sections 122 and each function operation of the target device 200 stored in the storage area of the storage section 128, for example, a configuration may be adopted in which toggle switching (ON and OFF of one function operation, or sequential switching of two or more different function operations) is performed for certain function operations based on the number of times the user has touched or depressed or the amount of time the user has touched or depressed. Also, another configuration may be adopted in which an individual function operation is set based on the degree of force applied by the user touching or depressing an area 102 or on the type of operation such as double-clicking.

Also, in the above-described embodiment, as the core unit 160, the dedicated device is used which is connected to the programming board 120 via a noncontact or contact type interface, as shown in FIG. 1. However, the present invention is not limited thereto, and a configuration may be adopted in which a general-purpose mobile terminal, such as a smartphone or a tablet, is used as the core unit 160. That is, any general-purpose mobile terminal which is commercially available in recent years can function as the operation section 162, the external I/F part 164, the storage section 166, the communication I/F section 168, the control section 170, and the power supply section 172 included in the core unit 160. Accordingly, by dedicated application software (compiler) for generating programs for controlling the operating state of the target device 200 being installed into such a mobile terminal, this general-purpose mobile terminal can be used as the core unit 160. Here, in the case where a general-purpose mobile terminal is used as the core unit 160, software for setting various types of parameters for the programming board 120 or the target device 200, software for performing code conversion of the above-described input operation information into a general-purpose language (text) and the like may be installed in addition to the compiler. Note that the above-described various types of parameters for the programming board 120 or the target device 200 are setting items capable of changing the detection sensitivity of each instruction detection section 122, the light emission status of each identification alteration section 124, an image displayed on each identification alteration section 124, the transmission and reception method of each block I/F section 126 and the like in the programming board 120, or the movement speed of the driving section, the light emission status, sound emission status, and vibration status of the function section, the communication method of the communication I/F section and the like in the target device 200. An example of the configuration where a mobile terminal is applied as the core unit 160 will be described in the descriptions of modification example 4 as well.

MODIFICATION EXAMPLES

Next, various types of modification examples of the programming educational device which has the program control device related to the above-described embodiment are described.

First Modification Example

Figure 13:
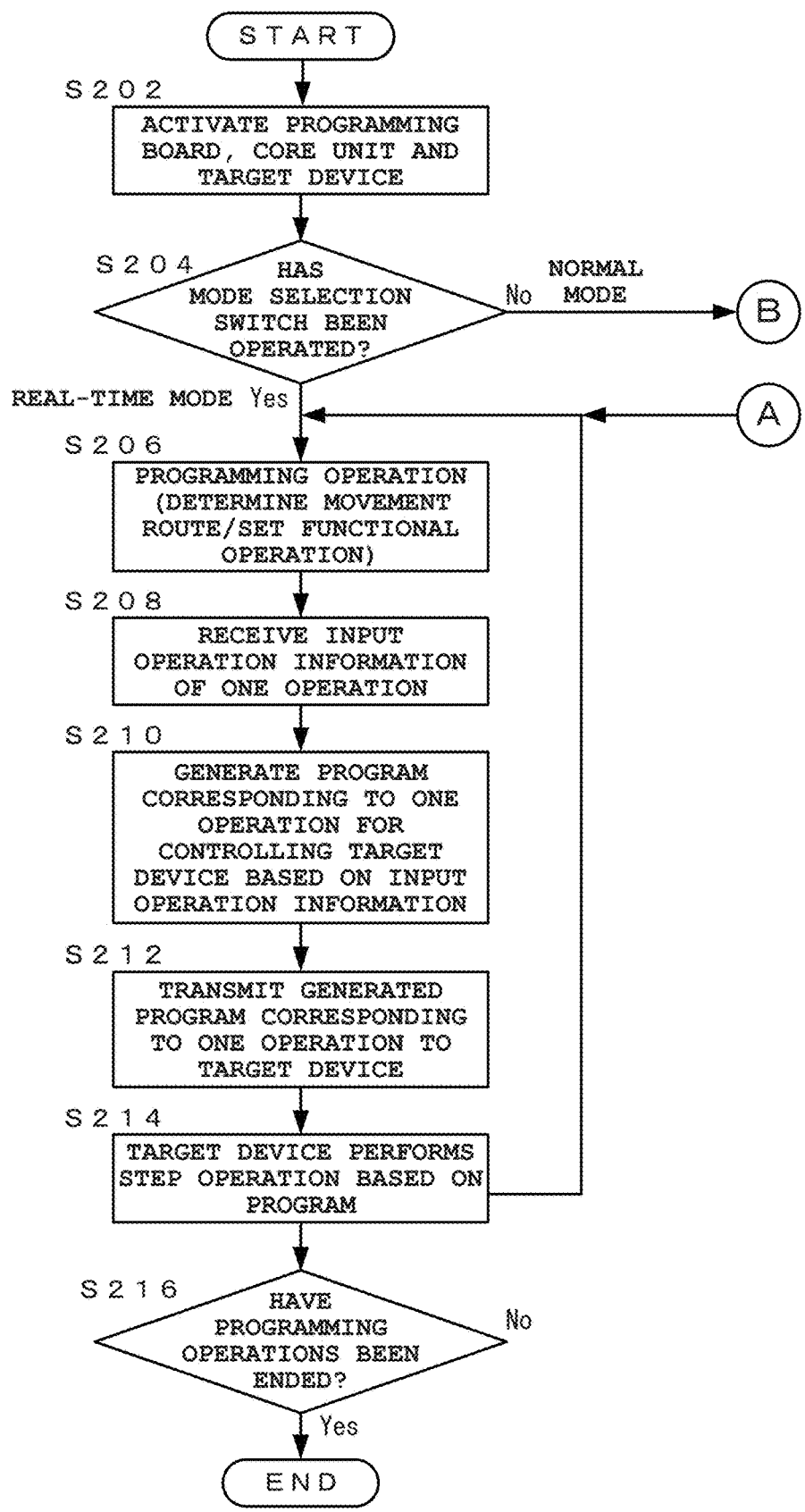
FIG. 13 is a flowchart showing a modification example (real-time mode) of the procedure including the programming operations, the program generation, and the execution method in the programming educational device according to the present embodiment.
Figure 14:
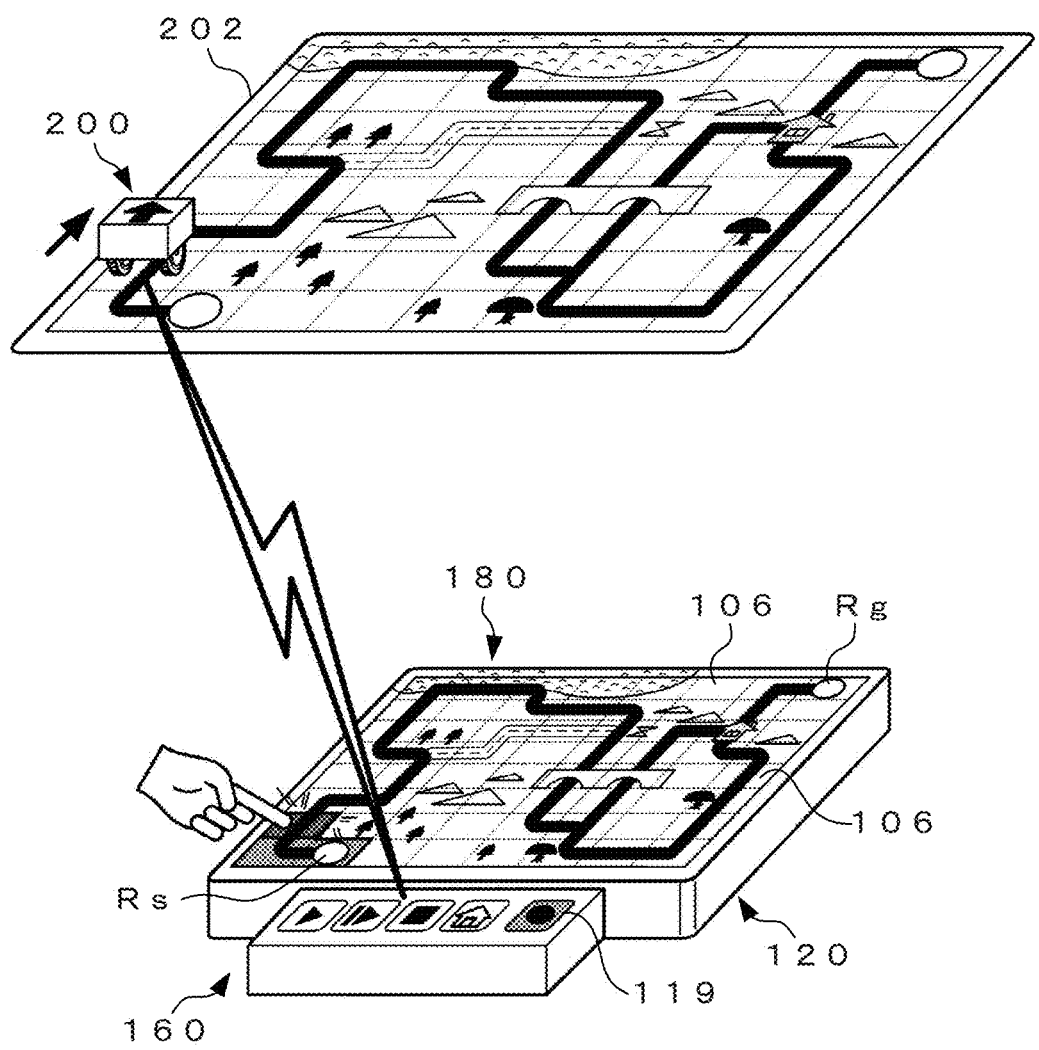
FIG. 14 is a first schematic diagram for describing programming operation processing, program generation, and execution processing applied in the modification example.
Figure 15:
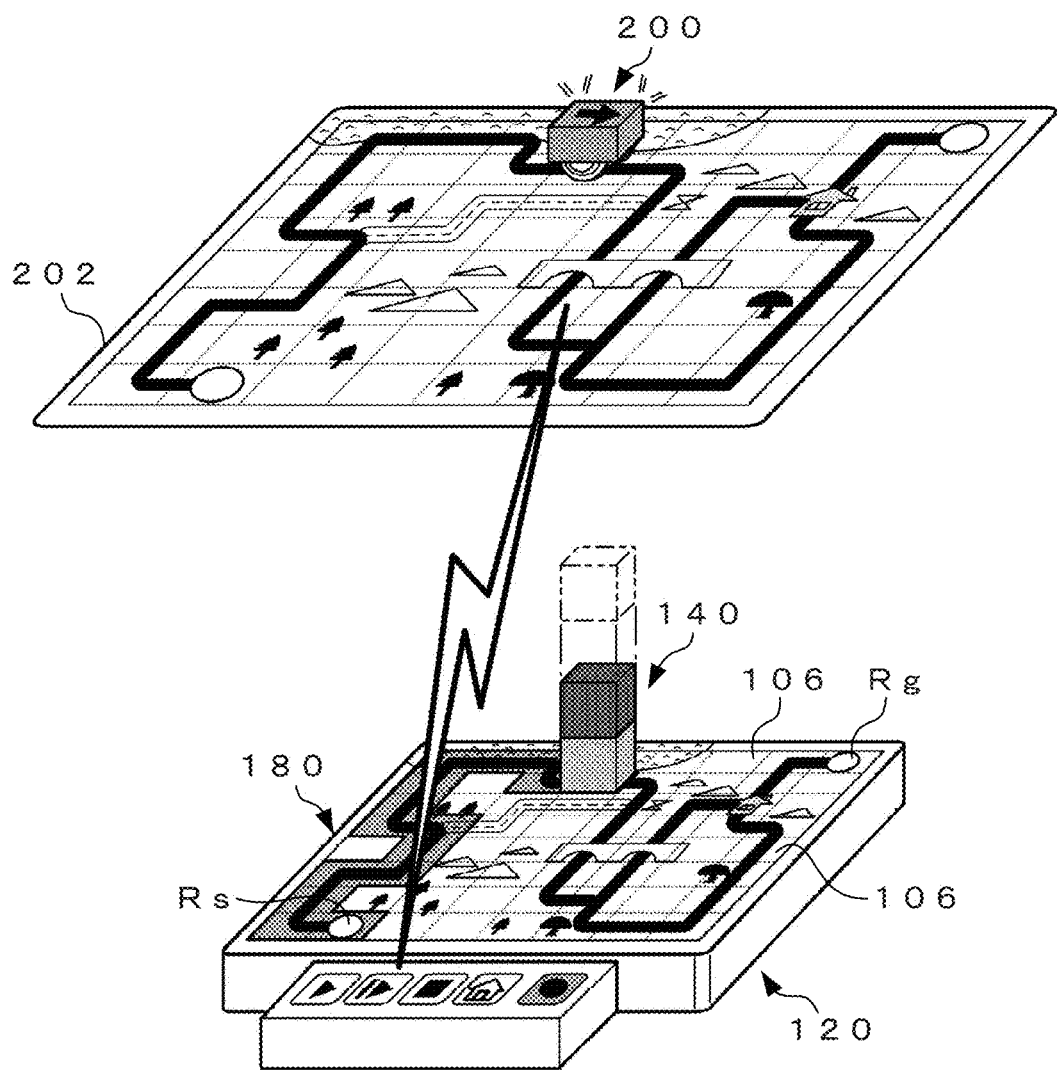
FIG. 15 is a second schematic diagram for describing the programming operation processing, the program generation and the execution processing applied in the modification example.

FIG. 13 is a flowchart showing a modification example (real-time mode) of the procedure including the programming operations, the program generation and the execution method in the programming educational device according to the present embodiment. FIG. 14 and FIG. 15 are schematic diagrams for describing programming operation processing, program generation and execution processing applied in the modification example. Here, descriptions of sections that are the same as those of the above-described embodiment are simplified.

In the above descriptions of the programming operations, the program generation, and the execution method in the programming educational device according to the present embodiment, the normal mode has been described in which, in the programming operation processing, the entire movement route of the target device 200 is determined and all function operations are set, and then the program generation processing and the program execution processing are performed. However, the modification example has a real-time mode in which, in the programming operation processing, a program corresponding to one operation is generated and transmitted to the target device 200 for execution every time an input operation corresponding to one operation is performed, in addition to the normal mode. Here, the user selects an arbitrary mode for learning programming (Programming Operation Processing)

In the programming operation processing in the programming educational device according to the modification example, first, the user connects the programming board 120 and the core unit 160 to each other, and activates the program control device 100 and the target device 200 (Step S202), as shown in the flowchart of FIG. 13. Also, the user attaches the guide sheet 180 to the programming area 104 of the programming board 120.

Next, the control section 170 of the core unit 160 judges whether or not the user has operated a mode selection switch 119 so as to set the normal mode or the real-time mode (Step S204). The mode selection switch 119 herein is to select between the processing operations of the normal mode described in the above embodiment and the later-described processing operations of the real-time mode. For example, a push switch or a slide switch is applied as this mode selection switch 119. In a structure where a push switch has been applied as the mode selection switch 119, when the control section 170 judges that the user has not depressed the mode selection switch 119 (No at Step S204), the normal mode, which has already been set by initial setting (default), is maintained. When judged that the user has depressed the mode selection switch 119 (Yes at Step S204), the control section 170 switches the normal mode to the real-time mode so as to set the real-time mode. Note that in a case where the mode selection switch 119 is depressed again in the set real-time mode, the real-time mode is switched to the normal mode and the normal mode is set again. That is, every time the mode selection switch 119 is depressed, switching between the normal mode and the real-time mode is performed.

When judged that the normal mode has been set by the mode selection switch 119, the control section 170 performs the processing operations of Step S106 and the following steps in the flowchart shown in FIG. 4 in the above-described embodiment. Conversely, when judged that the read-time mode has been set by the mode selection switch 119, the control section 170 performs processing operations of Step S206 and the following steps described below.

Note that the processing operations related to the mode switching and setting at Step S204 are similarly performed in the flowchart shown in FIG. 4 in the above-described embodiment. At Step S104, when the user has not depressed the mode selection switch 119, the normal mode set by initial setting is maintained, and the processing operations of Step S106 and the following steps are performed. When the user depresses the mode selection switch 119 and switches the normal mode to the read-time mode, the processing operations of Step S206 and the following steps are performed.

When the read-time mode is set, the control section 170 performs programming operation processing where the user determines a movement route of the target device 200 or sets a function operation to be performed by the target device 200, by using the programming board 120 having the guide sheet 180 and a programming block 140 (Step S206).

More specifically, in programming operation processing for determining a movement route of the target device 200, the user refers to an image shown on the guide sheet 180 attached to the programming board 120, and touches or depresses one partition 106 corresponding to a movement route where the target device 200 is operated by an amount equal to one operation, that is, one area 102 of the programming area 104 so as to indicate this partition 106, as shown in FIG. 14. Also, in programming operation processing for setting a function operation to be performed by the target device 200, the user sets a programming block 140 having a certain function operation set therein on one partition 106 where the target device 200 performs this function operation, as shown in FIG. 15.

When the user performs this programming operation, the one area 102 of the programming area 104 corresponding to the above-described partition 106 is indicated via the guide sheet 180 and a virtual route corresponding to the one operation for the movement route of the target device 200 is determined as shown in FIG. 14, or the one area 102 where the programming block 140 has been placed is indicated and the function operation to be performed by the target device 200 is set as shown in FIG. 15. Here, the control section 132 of the programming board 120 acquires indicated position information of the one indicated area 102 detected by the corresponding instruction detection section 122 and its sequential order information or block position information of the placed programming block 140 and its function information, and stores them in the storage area of the storage section 128. Also, the control section 132 causes the identification alteration section 124 of the indicated area 102 or the identification alteration section 144 of the programming block 140 to emit light in a predetermined light emission state or to alter a displayed image so as to be visually distinguishable (shown using a dark halftone color in FIG. 14 and FIG. 15 for convenience of description).

(Program Generation and Execution Processing)

When the indicated position information regarding the one operation and the sequential order information or the block position information and the function information are acquired in the programming operation processing, a control signal is transmitted to the control section 170 of the core unit 160 from the control section 132, and the program generation and the execution processing is performed. More specifically, the control section 170 of the core unit 160 receives input operation information including the indicated position information and the sequential order information or the block position information and the function information acquired in the programming board 120 by the programming operation processing (Step S208). This input operation information is received for each one programming operation (step).

Next, based on the received input operation information corresponding to the one operation, the control section 170 of the core unit 160 generates a program corresponding to the one operation which includes a command for controlling the operating state (movement or function operation) of the target device 200 (Step S210).

Then, the control section 170 transmits the generated program corresponding to the one operation to the target device 200 (Step S212), so that the program corresponding to the one operation is executed in the target device 200 and a step operation is performed in which the target device 200 is moved along the movement route on the play sheet 202 by an amount equal to the one operation or the target device 200 performs the function operation corresponding to the one operation at the specific position on the play sheet 202 (Step S214), as shown in FIG. 14 and FIG. 15.

The above-described programming operation processing, program generation, and execution processing for controlling the operating state of the target device 200 are repeatedly performed for each operation until the target device 200 is moved to a movement route end point on the play sheet 202 and the programming operations are completed (Step S216), as shown in FIG. 14 or FIG. 15. Here, the control section 170 makes a judgment that the programming operations have been completed, in response to the reception of an instruction (touch or depression) with respect to one partition 106 corresponding to the end point (goal) Rg. Also, for example, the control section 170 may make this judgment that the programming operations have been completed when a depression operation on the execution stop switch 116 is received at arbitrary timing during the programming operations.

Figure 16:
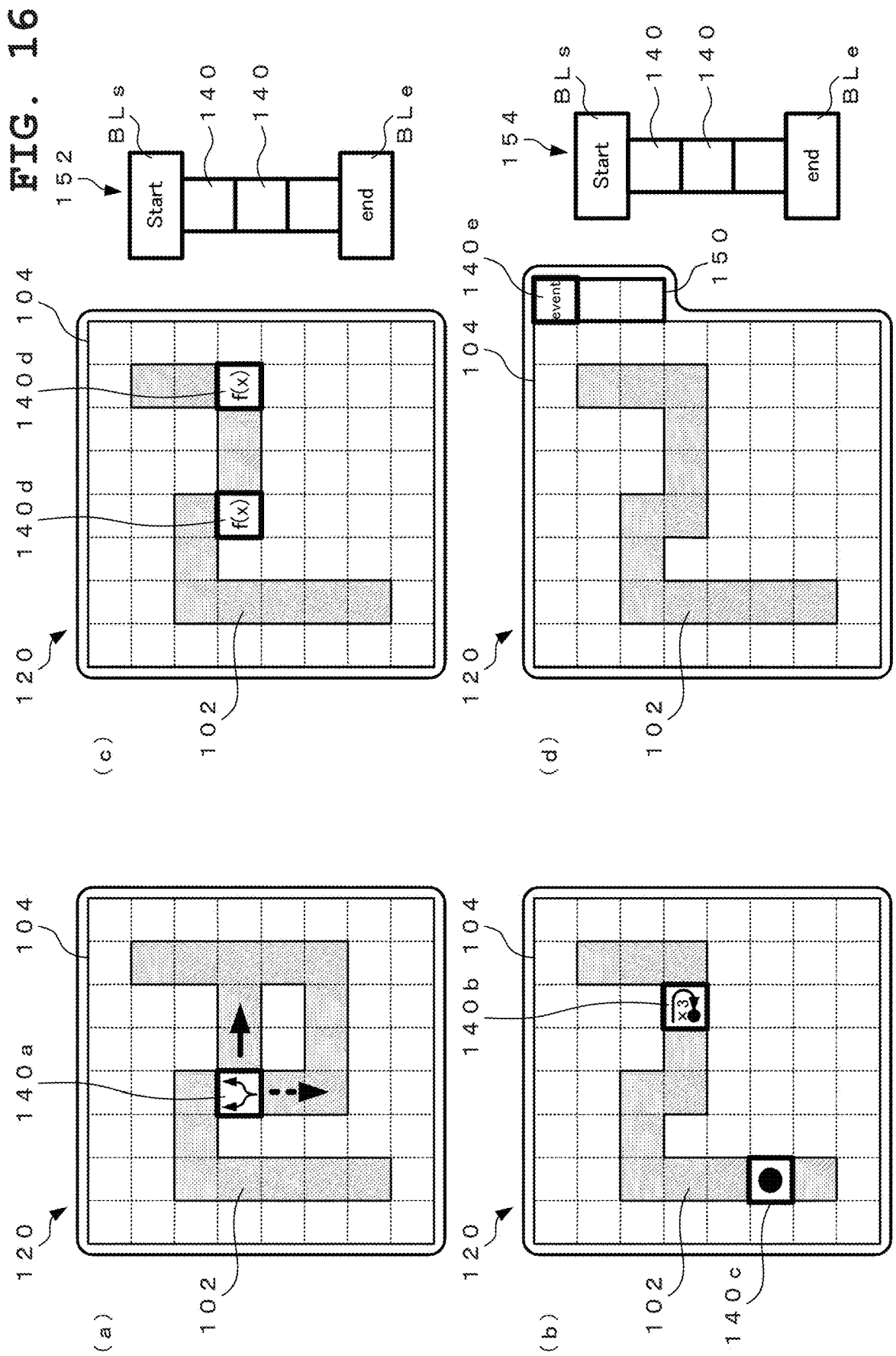
FIG. 16 is a schematic diagram showing modification examples (conditional branch, repetition, function, event) of function operations of programming blocks applied in programming operations in the programming educational device according to the present embodiment.

As described above, in this modification example, switching between the normal mode and the read-time mode is arbitrarily performed, whereby operation contents in the programming operation processing for controlling the operating state of the target device 200 and the execution statuses of programs can be visually grasped collectively or for each operation and therefore can be easily and intuitively understood from many sides. As a result of this configuration, the learning effect of programming can be expected to be improved Second Modification Example FIG. 16 is a schematic diagram showing modification examples (conditional branch, repetition, function, event) of function operations applied in programming operations in the programming educational device according to the present embodiment. Note that, here, descriptions of sections that are the same as those of the above-described embodiment are simplified.

In the programming operations, the program generation, and the execution method for the programming educational device according to the above-described embodiment, a programming block 140 is placed on an indicated area 102 on the programming area 104 of the programming board 120, whereby a function operation (action) excluding the movement of the target device 200 is set. In this modification example, programming learning is performed in which a programming block 140 where a function operation of the target device 200 other than action has been set is placed on an indicated area 102 on the programming area 104 and whereby the target device 200 is controlled to be in various operating states.

In programming blocks 140 to be used in programming operations in this modification example, four types of function operations "conditional branch", "repetition", "function" and "event" are set besides the function operation "action" shown in the above-described embodiment. Hereafter, each function operation is described.

(Conditional Branch)

Here, a programming block (conditional branch block) 140a where "conditional branch" has been set as a function operation is placed on an indicated area 102 on the programming area 104 of the programming board 120 so as to set such that the target device 200 at a position on a movement route corresponding to the indicated area 102 performs a function operation related to conditional branching, as shown in FIG. 16(a). The conditional branching herein refers to, for example, an operation where a program execution status differs depending on where a programming block 140 is moved from its placed position, based on a condition specified in advance for a function operation. For example, in FIG. 16(a), a route where the target device 200 is moved diverges based on this condition.

Examples of this condition include a condition by which an operation differs depending on whether an illumination level detected by an illumination sensor provided in the target device 200 is larger than a predetermined value, a condition by which the target device 200 is temporarily stopped when it reaches a position corresponding to an indicated area 102 where the conditional branch block 140a has been placed, and a condition by which an operation differs depending on the frequency of detected sounds made by the user clapping the hands and detected by a microphone in the target device 200 when the target device 200 is in a temporarily stopped state. Note that these conditions are merely examples and, as a matter of course, other conditions may be adopted.

As a method for setting the above-described condition, the following methods can be applied. For example, a method may be adopted in which the configuration of the conditional branch block 140a itself is programmable, and a device is used which is capable of setting a condition in the program. More specifically, a device is used which is capable of setting whether to detect sound, whether to detect light, the type of an operation that is performed based on the frequency of sounds and the like. Also, a method may be adopted in which another programming block 140 where one of the above-described conditions or the like has been set in advance is placed on the conditional branch block 140a. Moreover, a method may be adopted in which one of the above-described conditions has been incorporated into the conditional branch block 140a itself.

(Repetition)

When a programming block (repetition block) where "repetition" has been set as a function operation is placed on an indicated area 102 on the programming area 104 of the programming board 120, setting is performed such that the target device 200 at a position on a movement route corresponding to the indicated area 102 performs a function operation related to repetition. Note that the repetition herein refers to an operation of repeatedly moving the same moving route by a specified number of times.

The configuration of the repetition block and a setting method therefor are as follows. For example, a repetition start block 140b and a repetition end block 140c are provided. By these blocks 140b and 140c being placed on indicated areas 102 on the programming area 104, the target device 200 which has reached a movement route corresponding to these indicated areas 102 repeats an operation of returning from the repetition start block 140b to the repetition end block 140c by a specified number of times (such as three times), as shown in FIG. 16(b).

Also, in another example, only the repetition start block 140b is provided and, by this repetition start block 140b being placed on an indicated area 102 on the programming area 104, the target device 200 which has reached a position corresponding to the indicated area 102 repeats an operation of returning to the start position with no condition by a specified number of times.

As a method for specifying the number of times of the repetition, the following methods can be used.

In one example, a repetition block where a repeat count has been set in advance is used. In another example, a count block for specifying a repeat count is provided, and placed on the repetition start block 140b.

In still another example, a repeat count is specified by a dial provided on the repetition block. In yet another example, a repeat count is specified by a ten-key keypad and a display screen provided on the repetition block. In yet another example, a counter button and a display screen are provided on the repetition block, and a repeat count is specified by the counter button being depressed.

(Function)

When a programming block (function block) 140d where "function" has been set as a function operation is placed on an indicated area 102 on the programming area 104 of the programming board 120, setting is performed such that the target device 200 at a position on a movement route corresponding to the indicated area 102 performs a function operation related to a function, as shown in FIG. 16(c). Note that the function herein refers to one or a group of "actions" such as those shown in the above-described embodiment. When the target device 200 moves to a position on a movement route corresponding to an indicated area 102 where the execution of a function operation related to a function has been set, a group of "actions" is collectively performed at that position. More specifically, for example, one "function" is constituted by a group of four "actions" such as "rotate rightward at a current position by 90 degrees", "emit a predetermined sound", "perform image capturing", and "rotate leftward at the current position by 90 degrees" and, when the target device 200 moves to the above-described position, these four "actions" are sequentially performed at that position.

These specific contents of "function" are specified by, for example, a programming operation of connecting (connection arrangement) one or more programming blocks 140 where arbitrary "actions" have been set, in an area other than the area of the programming board 120, as shown in FIG. 16(c). One or a group of programming blocks 140 connected and arranged at a different place as described above are referred to as a function body 152. This function body 152 includes a start point block BLs and an end point block BLe, and one or more programming blocks 140 specifying the user's intended "actions" are connected and arranged therebetween. Then, in the programming execution therefor, the target device 200 performs the "actions" arranged between the start point block BLs and the end point block BLe in order of arrangement.

Note that the same function blocks 140d may be arranged on two or more indicated areas 102 among a plurality of indicated areas 102 included in a virtual route specified on the programming board 120 by programming operations, as shown in FIG. 16(c). Accordingly, in programming execution, when desiring to control the target device 200 to perform the same group of actions a plurality of times at different positions on a moving route, the user is only required to program one function and place a plurality of function blocks 140d corresponding to the group of actions on a plurality of indicated areas 102 corresponding to these different positions. As a result of this configuration, the user is not required to perform a plurality of programming operations for the same group of actions, so that the number of times of programming operations is reduced and the learning effect of programming using functions can be expected to be improved.

Also, two or more types of function blocks 140d specifying contents different from one another may be arranged on two or more indicated areas 102 included in a virtual route, respectively. In addition, the same or different function blocks 140d may be stacked and arranged on one indicated area 102. In the case where programming operations are performed using two or more types of function blocks 140d as described above, operations of pairing each function block 140d with at least a corresponding start point block BLs wirelessly or in a wired manner are performed in the programming operations. As a result, in the programming execution therefor, the target device 200 performs each group of actions specified by programming blocks 140 of a function body 152 including a start point block BLs paired with a function block 140d. Note that the programming blocks 140 of each function body 152 arranged external to the programming board 120 and the programming board 120 are connected via a non-contact or contact type interface, and the function information of each function body 152 is transmitted to the programming board 120.

(Event)

"Event processing" is processing that is also referred to as interrupt processing, and is performed by the target device 200 when any event occurs at arbitrary timing during the execution of a program for controlling the operating state of the target device 200. Examples of this event include an event that the target device 200 has run into an obstacle or the like while moving as programmed, an event that the user has said "stop" or "proceed", and an event that the surrounding area of the target device 200 has darkened suddenly. However, it goes without saying that the event is not limited to these examples. When any of the various events described above is detected by the target device 200, the target device 200 performs a function operation set in advance corresponding to this event with this detection as a trigger. Note that a configuration may be adopted in which the occurrence of an event is detected by not the target device 200 but one of the programming board 120, the programming blocks 140, the core unit 160, the guide sheet 180.

The event processing is performed by, for example, an event zone 150 being provided around the programming area 104 of the programming board 120 and an event block 140e being placed thereon, as shown in FIG. 16(d). The specific contents of the event processing are specified by, for example, a programming operation of connecting (connection arrangement) one or more programming blocks 140 where arbitrary "actions" have been set, in an area other than the area of the programming board 120, as shown in FIG. 16(d). One or a group of programming blocks 140 connected and arranged at a different place as described above are referred to as an event processing body 154. The specific configuration of this event processing body 154 is the same as that of the above-described function body 152, and therefore explanations thereof are omitted. Also, as in the case of the function blocks 140d, two or more types of function blocks 140e specifying contents different from one another may be arranged on two or more indicated areas 102 included in a virtual route, respectively. In addition, the same or different function blocks 140e may be stacked and arranged on one indicated area 102. Note that the programming blocks 140 of the event processing body 154 arranged external to the programming board 120 and the programming board 120 are connected via a non-contact or contact type interface, and the function information of the event processing body 154 is transmitted to the programming board 120.

As described above, according to this modification example, in programming operations using the programming board 120 and the programming block 140, the target device 200 can be set to perform the function operation "conditional branch", "repetition", "function" or "event" set in the certain programming block 140 and having a higher abstraction level in addition to "sequential execution" of "actions" by a simple operation of placing this programming block 140 on an arbitrary area 102 on the programming board 120.

Thus, by the tangible structure, even young children can easily perform programming related to a combination of a movement and various types of function operations for the target device 200, and easily and intuitively grasp its operation contents and operating state visually. Accordingly, the learning effect of programming having a higher abstraction level can be expected to be improved.

In this modification example, "conditional branch", "repetition", "function" and "event" have been individually described as function operations set in the programming blocks 140. However, an arbitrary combination thereof may be set. Also, in this modification example, the body portions that specify function operations related to "function" and "event" are programmed in an area other than the area of the programming board 120. However, a structure may be adopted in which a program that serves as the above-described function body or event processing body is generated in an area created by a peripheral portion of the programming area 104 of the programming board 120 being extended.

Third Modification Example

Figure 17:
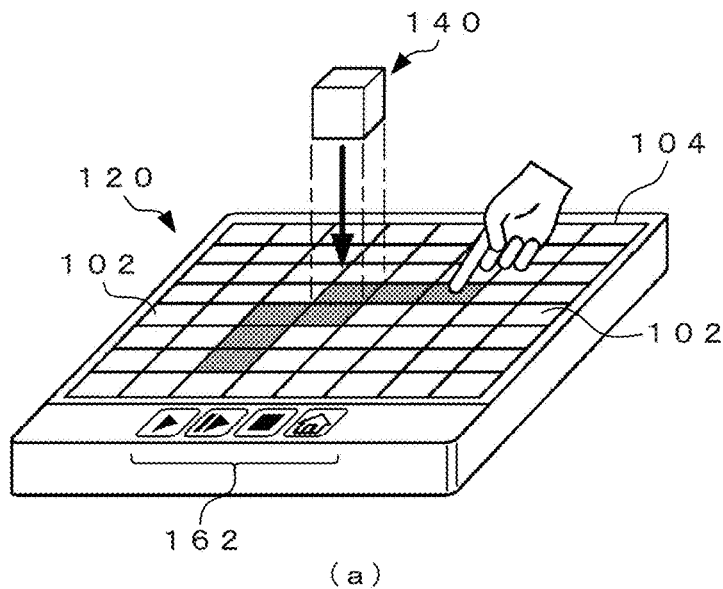
FIG. 17 is a schematic diagram showing a modification example of the programming educational device (programming device) according to the present embodiment.
Figure 17:
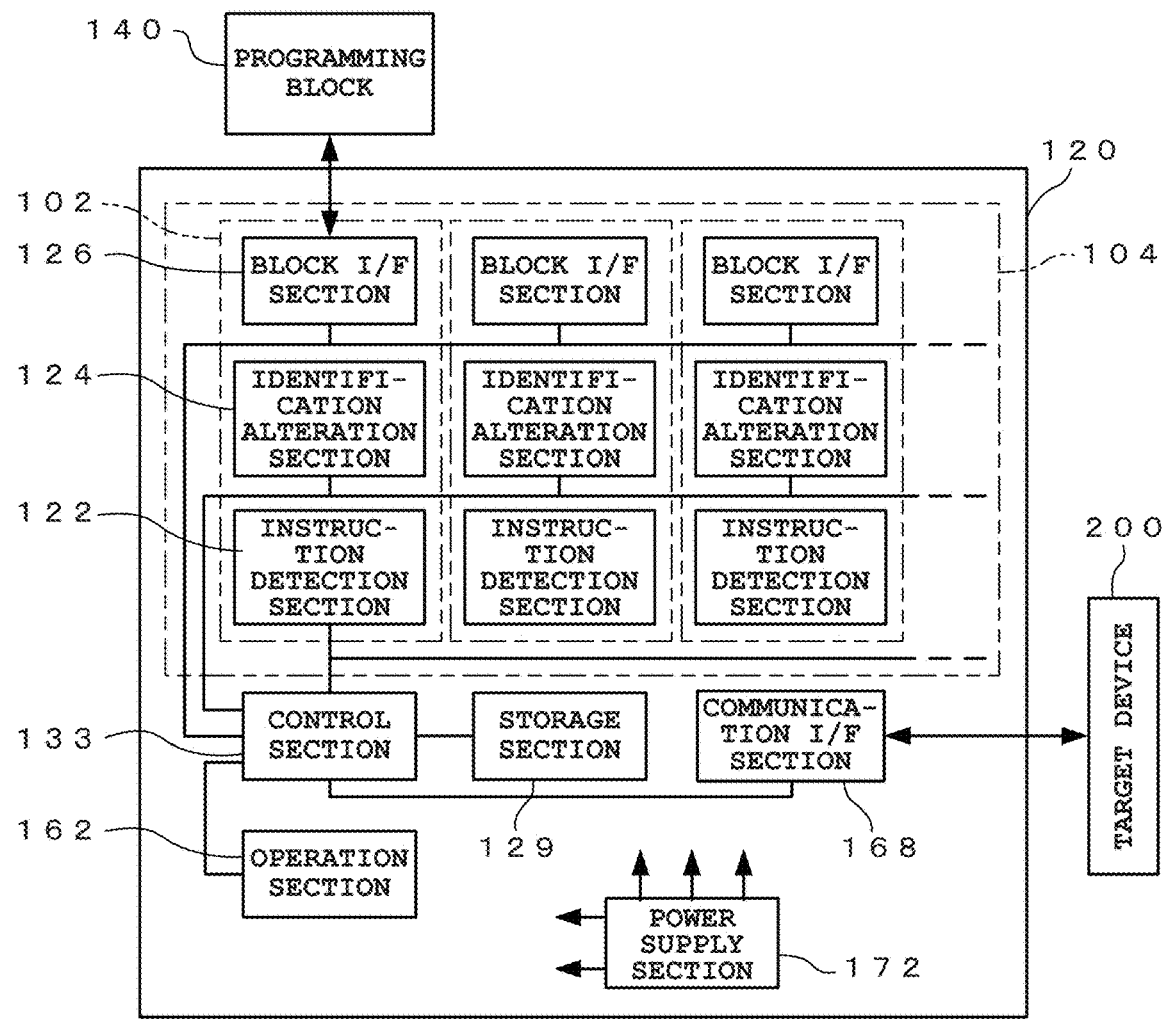

FIG. 17 is a schematic diagram showing a modification example of the programming educational device (programming device) according to the present embodiment. Here, FIG. 17(a) is a schematic diagram showing a structure where the programming board and the core unit have been integrally formed, and FIG. 17(b) is a function block diagram showing a configuration example that is applied in the programming board of this modification example. Note that, here, descriptions of sections that are the same as those of the above-described embodiment are simplified.

In the programming educational device according to the above-described embodiment, the structure has been described in which the programming board 120 and the core unit 160 are provided separately, and the transmission and reception of input operation information therebetween and the supply of driving power therebetween are performed via the non-contact or contact type interfaces. However, this modification example has a structure where the programming board 120 and the core unit 160 have been integrally formed.

In the structure of this modification example, the core unit 160 shown in the above-described embodiment has been integrally formed with the programming board 120, and the various types of switches on the operation section 162 of the core unit 160 have been arranged around the programming area 104 of the programming board 120, as shown in FIG. 17(a).

This modification example has a configuration that actualizes the above-described functions of the programming board 120 and the unit 160, as shown in FIG. 17(b). A storage section 129 herein has functions equivalent those of the storage section 128 of the programming board 120 and the storage section 166 of the core unit 160 shown in the above-described embodiment. That is, this storage section 129 stores in a predetermined storage area input operation information including indicated position information, sequential order information, block position information and function information acquired by the instruction detection sections 122 and the block I/F sections 126, and stores in another storage area programs generated by a control section 133 based on the input operation information. Moreover, this storage section 129 may store a program that is used to generate, in the control section 133, programs for controlling the operating state of the target device 200 based on input operation information, a program for controlling the operation of each section of the programming board 120 and various types of other information. That is, the storage section 128 has a RAM and a ROM.

Also, the control section 133 is a processor of a computer which controls the operation of each section of the programming board 120 having the instruction detection sections 122, the identification alteration sections 124, the block I/F sections 126, the storage section 129, the operation section 162, the communication I/F section 168 and the power supply section 172, and has functions equivalent those of the control section 132 of the programming board 120 and the control section 170 of the core unit 160 shown in the above-described embodiment. That is, when the user's instructions performed on areas 102 in the programming area 104 are detected, or when a state is detected in which programming blocks 140 have been placed on indicated areas, the control section 133 stores acquired input operation in the storage area of the storage section 129. Also, the control section 133 generates programs for controlling the operating state of the target device 200 based on input operation information, and transmits the generated programs to the target device 200 in response to a switch operation on the operation section 162 so as to control the operating state of the target device 200.

Note that, in this modification example, the external I/F sections 130 and 164 shown in FIG. 2 which is used for communicating between the programming board 120 and the core unit 160 are omitted. Also, in this modification example, each section described above is operated by electric power supplied from the single power supply section 172. Moreover, in this modification example as well, the guide sheet 180 for supporting and guiding programming operations may be attached on the programming area 104 as with the above-described embodiment, but is not necessarily required to be attached. Furthermore, as a method for setting function operations of the target device 200, the method using programming blocks 140 as shown in FIG. 17(a) may be adopted, but a method not using them may also be adopted.

By the programming board 120 and the core unit 160 being integrally formed as described above, programming operations, program generation, and the control of the operating state of the target device 200 can be performed by the programming board 120 alone. Here, by the transmission and reception of various types of information being omitted or the number of times of storing or reading in or from the storage section 129 being reduced in each processing operation, the entire processing can be simplified in the modification example. Also, in the modification example, the number of the parts constituting the program control device 100 can be reduced, and the supply of driving power to the program control device 100 can be stably performed.

Fourth Modification Example

Figure 18:
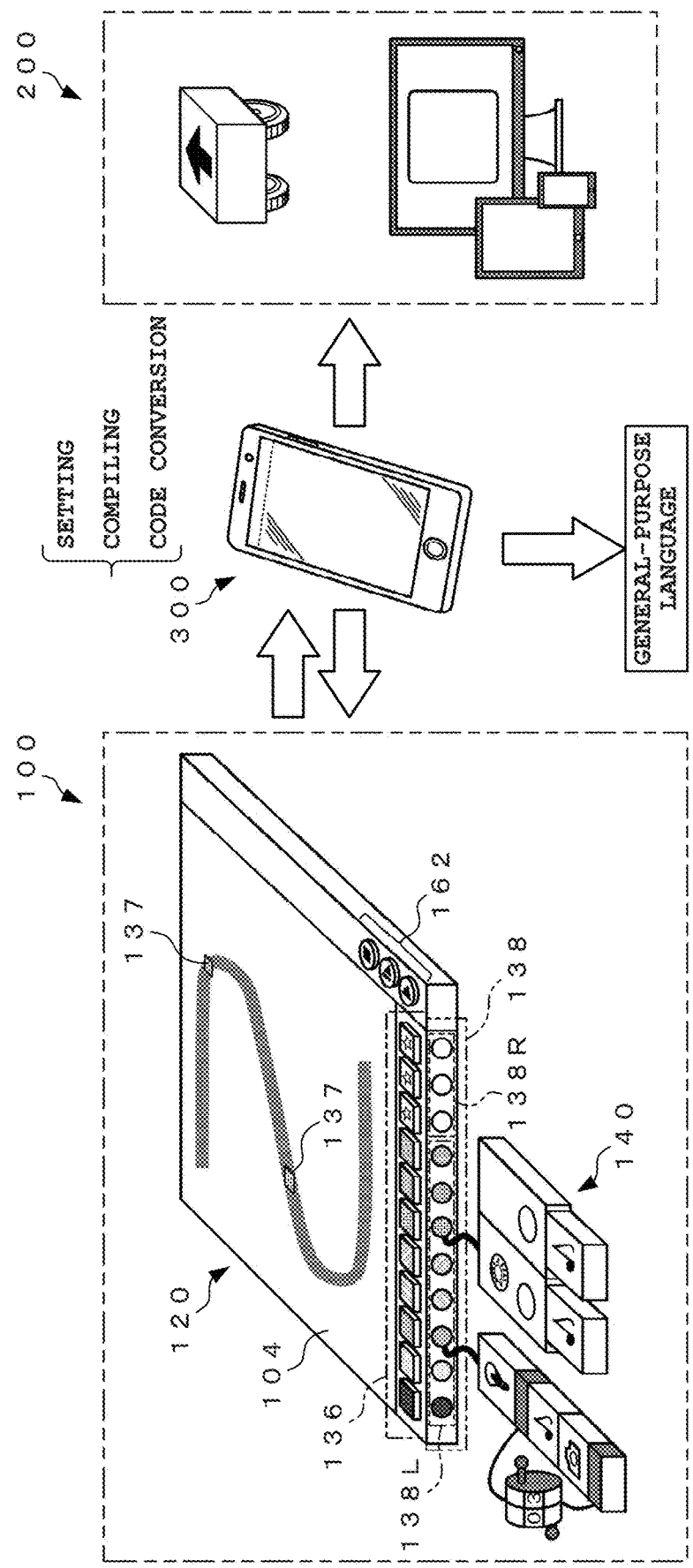
FIG. 18 is a schematic diagram showing another modification example of the programming educational device (programming device) according to the present embodiment.
Figure 19:
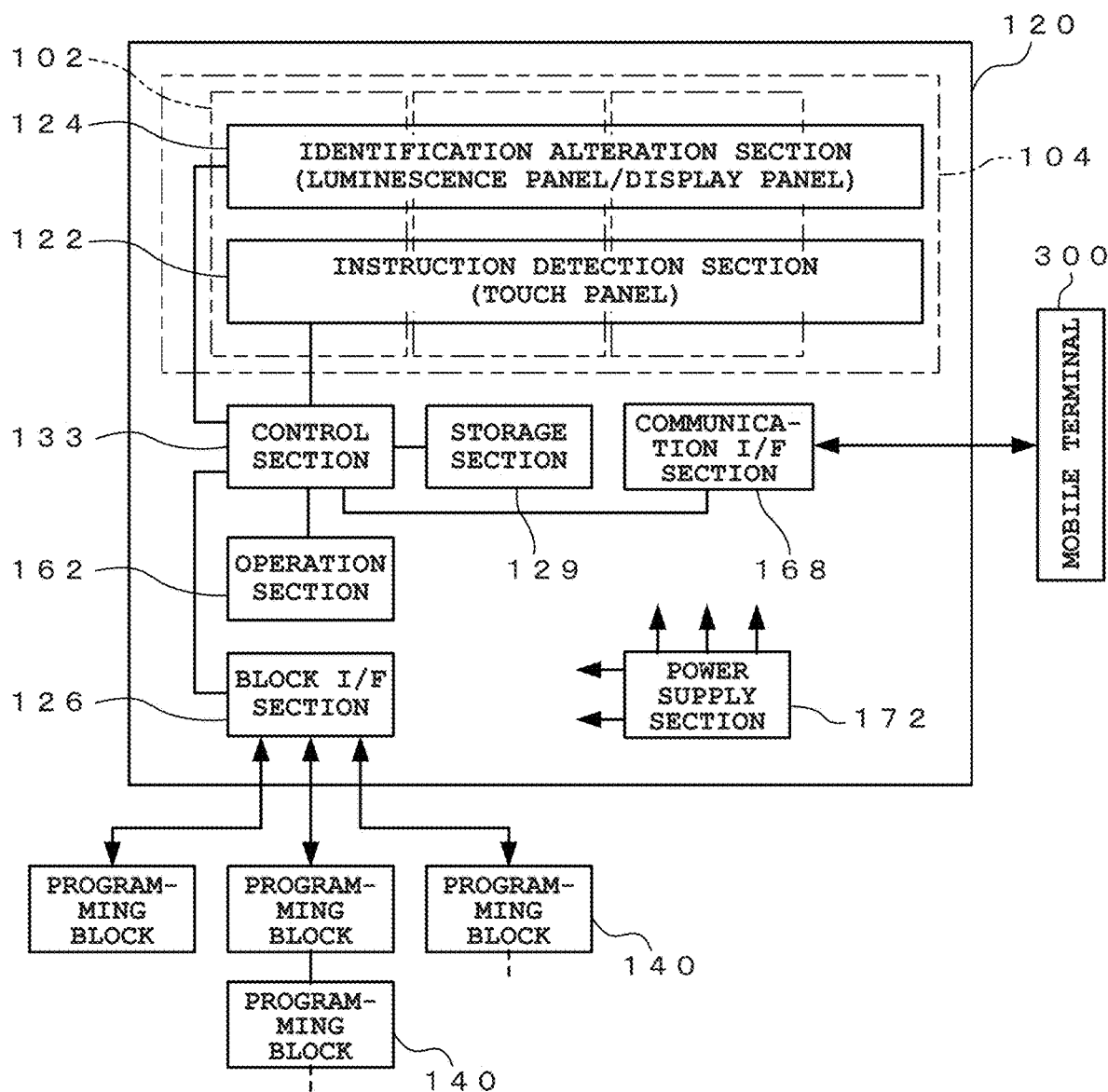
FIG. 19 is a function block diagram showing a structural example of the programming educational device of the modification example.

FIG. 18 is a schematic diagram showing another modification example of the programming educational device (programming device) according to the present embodiment, and FIG. 19 is a function block diagram showing a structural example of the programming educational device of this modification example. Note that, here, descriptions of sections that are the same as those of the above-described embodiment and the third modification example are simplified.

In the programming educational device of the above-described embodiment, the programming board 120 and the core unit 160 are separately provided, function operations of the target device 200 are set by programming blocks 140 being placed on arbitrary areas 102 of the programming board 120, and programs for controlling the operating status of the target device 200 are generated by input operation information acquired in the programming board 120 being transmitted to the core unit 160. In this modification example, the programming board 120 and part of the core unit 160 are integrally formed, markers for setting functions are placed or set on a virtual route in the programming area 104, and function operations that are performed by the target device 200 at specific positions are set by the markers and one or more programming blocks 140 arranged external to the programming board 120 being associated with one another. Also, in this modification example, input operation information acquired in the programming board 120 is transmitted to a general-purpose mobile terminal, and programs for controlling the operating state of the target device 200 are generated in the mobile terminal.

This modification example mainly includes the program control device 100, the target device 200, and a general-purpose mobile terminal 300, and the program control device 100 includes the programming board 120 and the programming blocks 140, as shown in FIG. 18. In this modification example, part of the core unit 160 shown in the above-described embodiment has been integrally formed with the programming board 120, and the operation section 162 having various types of switches (a batch execution switch, a stepwise execution switch, an execution stop switch) as with that of the above-described core unit 160 has been arranged around the programming area 104 of the programming board 120, as shown in FIG. 18.

Also, on a portion around the programming area 104, a plurality of function setting buttons 136 and a plurality of block connection terminals 138 have been arranged. Here, the function setting buttons 136 and the block connection terminals 138 have been set as pairs each having a one to one relation. These block connection terminals 138 are provided in the block I/F section 126 and connected to programming blocks 140 arranged external to the programming board 120 via non-contact or contact type interfaces.

Each programming block 140 or a plurality of joined programming blocks 140 to be connected to the block connection terminal 138 are capable of setting complicated functions as with the function body 152 for "function" and the event processing body 154 for "event processing" shown in the above-described modification example (refer to FIG. 16), in addition to a function operation for showing one action.

More specifically, among the plurality of (eleven) block connection terminals 138 arranged in FIG. 18, a group of terminals 138L having eight block connection terminals 138 on the left side of the drawing sets function operations (branch, repetition and function) in association with one of a plurality of indicated areas 102 included in a virtual route specified on the programming board 120. Also, among the plurality of (eleven) block connection terminals 138, a group of terminals 138R having three block connection terminals 138 on the right side of the drawing sets a function operation (event) that is not related to any indicated area 102 on the virtual route.

Also, each function setting button 136 is subjected to an ON operation when a position where the target device 200 performs a specific function operation is set. When the user indicates an arbitrary position on the virtual route (drawn with a curved halftone line in FIG. 18) in the programming area 104, this position is specified by a marker 137.

When a programming operation is performed in which one or more programming blocks 140 is connected to one block connection terminal 138 of the terminal group 138L or the terminal group 138R and a function setting button 136 corresponding to this one block connection terminal 138 is subjected to an ON operation so as to set the corresponding marker 137 on the programming board 120, a function operation of the target device 200 to be performed at a position corresponding to the marker on the movement route is set.

As described above, each marker 137 is set by a touch operation that is performed by the user touching or depressing an arbitrary position on a virtual route in the programming area 104. Here, this marker 137 may have a configuration in which, when it is detected by an instruction detection section 122 at that position (or area), it causes the corresponding identification alteration section 124 to emit light or changes a displayed image so as to be visually distinguished. Also, in a case where a capacitive touch panel has been adopted as an instruction detection section 122, a member or a small component made of dielectric material may be used as the above-described marker 137 so that this marker 137 is visually distinguished when it is placed on an arbitrary position on a virtual route.

Also, the control section 132 of the programming board 120 associates position information (marker position information) specified by a marker 137 with function information regarding a function operation set in a programming block 140 connected to a block connection terminal 138 provided corresponding to a function setting button 136 used to set the marker 137, and stores them in a storage area of the storage section 129 as input operation information.

That is, in this modification example, the programming blocks 140 are not placed on the programming board 120 unlike the above-described embodiment (refer to FIG. 1). On the programming board 120, programming operations for determining a movement route of the target device 200 and positions for function operations are performed. Also, around the programming board 120, programming operations for setting function operations by the programming blocks 140 are performed.

Also, as in the case of the programming board 120 of the above-described embodiment (refer to FIG. 3), this modification example includes a common touch panel provided on the entire programming area 104 as an instruction detection section 122, and a common luminescence panel or a common display panel provided on the entire programming area 104 as an identification alteration section 124, as shown in FIG. 19. Here, by the resolution of the programming area 104 being enhanced so that a virtual route having a freely curved shape can be specified by a handwriting operation on the touch panel as shown in FIG. 18, a movement route having a smoothly curved shape can be set, and areas corresponding to a movement route of the target device 200 can be caused to vividly and clearly emit light or display an image so as to be distinguished at the time of programming operations or program execution.

The general-purpose mobile terminal 300 is a commercially available smart phone, tablet and the like as described above, and is connected to the programming board 120 and the target device 200 through a non-contact or contact type interface. A control section (command generation section) in the mobile terminal 300 generates programs for controlling the operating state of the target device 200 based on input operation information received from the programming board 120, and transmits it to the target device 200. Also, in response to the reception of inputs related to various parameters of the programming board 120 and the target device 200, the control section of the mobile terminal 300 sets these various parameters or selects the target device 200. Moreover, the control section of the mobile terminal 300 performs code conversion on input operation information received from the programming board 120 so as to convert it to a general-purpose language (text). That is, the general-purpose mobile terminal 300 has functions equivalent to those of the above-described core unit 160, and dedicated software for actualizing these functions has been installed therein.

As with the above-described embodiment, the target device 200 is moved along a set movement route in accordance with operations performed on the operation section 162 of the programming board 120 or the mobile terminal 300. Here, at positions on the movement route which correspond to areas on a virtual course where markers 137 have been placed or set, the target device 200 performs function operations set by programming blocks 140 associated with the markers 137.

As described above, in this modification example, programming operations related to the movement of the target device 200 are performed using the programming board 120, and programming operations related to function operations of the target device 200 are performed using programming blocks 140 arranged external to the programming board 120. As a result of this configuration, separate interfaces can be used in accordance with the contents of programming operations, and intuitive and step-by-step programming learning can be actualized.

Also, by the configuration where programming operations related to function operations of the target device 200 are performed using programming block 140 arranged external to the programming board 120, function operations to be performed by the target device 200 can be freely combined, whereby function operations for complicated processing can be actualized.

In the above-described embodiment and each modification example, the programming educational device for young children has been described. However, the present invention is not limited thereto. Since the present invention has the feature that the contents of operations and the operating state of the target device can be grasped and understood through sight and tangible operations, the present invention may be targeted for programming beginners, people who need rehabilitation for body function recovery and the like.

The present invention is not limited to each of the above-stated embodiments, which can be variously modified without departing from the essential points in the execution phase. Furthermore, an invention with a variety of steps is included in each of the above-stated embodiments, and various inventions may be extracted with a suitable combination of the disclosed plurality of constituent features. For example, even if some constituent features are eliminated from the overall constituent features indicated in each embodiment or a configuration is devised from several constituent features that are combined differently, the invention described in the problems to be solved by the invention can be solved. When the effect described in the effect of the invention can be acquired, a configuration with these constituent features that were eliminated or combined can be extracted as an invention.

The invention claimed is:

1. A programming device comprising:
a programming board which is a tangible object that can be directly and physically touched in real space, and which includes:
a first shape indication section which, in response to indication of two or more portions by a user operation among a plurality of tangible portions arranged in a planar direction of the programming board, indicates a first shape in the planar direction;
a command generation section which generates a command for moving a control target section along the first shape indicated by the first shape indication section; and
an operation support section which is operable to specify the first shape in advance by designating two or more portions among the plurality of tangible portions as instruction allowable areas and designating other portions among the plurality of tangible portions as instruction prohibited areas, the two or more portions designated as instruction allowable areas defining the first shape,
wherein, when the operation support section is operated to specify the first shape in advance, the first shape indication section judges a user operation performed on a portion from among the plurality of tangible portions which is designated as an instruction prohibited area to be invalid and thereby prohibits a shape different from the first shape from being indicated,
wherein the operation support section comprises a guide sheet which is a tangible object other than the programming board, and which can be directly and physically touched in real space and is structured to be overlaid on the programming board to specify the first shape.

2. The programming device according to claim 1, further comprising:
a function setting section which sets a function that is executed by the control target section in association with any portion of the plurality of tangible portions, wherein the command generation section generates a command for causing the control target section to execute the function set by the function setting section when the control target section has moved to a position corresponding to said any portion.

3. The programming device according to claim 1, wherein any portion of the plurality of tangible portions further comprises a reception section which receives setting of a function, and
wherein, the command generation section generates a command for causing the control target section to execute the function received by the reception section when the control target section has moved to a position corresponding to said any portion.

4. The programming device according to claim 1, wherein the command generation section is configured to selectively operate in:
a first command generation mode in which the command generation section generates the command including a command for moving the control target section along a route corresponding to the first shape, from a start point to an end point of the route, in response to the command, and
a second command generation mode in which the command generation section generates the command including a command for, every time a next portion is indicated in the first shape indication section, moving the control target section along the first shape in response to the command corresponding to indication of the next portion.

5. The programming device according to claim 1, wherein the operation support section is arranged so as to be overlapped on the plurality of tangible portions.

6. The programming device according to claim 1, wherein the operation support section is formed of a transparent or semi-transparent material.

7. The programming device according to claim 1, wherein, in the operation support section, the first shape is drawn in advance as an image.

8. The programming device according to claim 7, wherein, in the operation support section, the image is drawn in advance as a virtual route.

9. The programming device according to claim 1, wherein the operation support section is provided with a plurality of partitions and, in the planar direction, respective areas of the plurality of partitions are approximately equal to areas of the tangible portions.

10. A programming support method executed by a programming device including (A) a programming board which is a tangible object that can be directly and physically touched in real space and (B) an operation support section comprising a guide sheet which is a tangible object other than the programming board, and which can be directly and physically touched in real space and is structured to be overlaid on the programming board, the method comprising:
in response to indication of two or more portions by a user operation among a plurality of tangible portions arranged in a planar direction of the programming board, indicating a first shape in the planar direction;
generating a command for moving a control target section along the indicated first shape; and
specifying the first shape in advance by operation of the operation support section, the first shape being specified in advance by designating, in accordance with the operation of the operation support section, two or more portions among the plurality of tangible portions as instruction allowable areas and designating other portions among the plurality of tangible portions as instruction prohibited areas, the two or more portions designated as instruction allowable areas defining the first shape,
wherein, when the operation support section is operated to specify the first shape in advance, a user operation performed on a portion from among the plurality of tangible portions which is designated as an instruction prohibited area is judged to be invalid, thereby prohibiting a shape different from the first shape from being indicated,
wherein the guide sheet is structured to be overlaid on the programming board to specify the first shape.

11. A non-transitory computer-readable storage medium having a program stored thereon that is executable by a computer of a programming device including (A) a programming board which is a tangible object that can be directly and physically touched in real space and (B) an operation support section comprising a guide sheet which is a tangible object other than the programming board, and which can be directly and physically touched in real space and is structured to be overlaid on the programming board, the program being executable by the computer to control the computer to perform processing comprising:
a first shape indication processing for, in response to indication of two or more portions by a user operation among a plurality of tangible portions arranged in a planar direction of the programming board, indicating a first shape in the planar direction;
a command generation processing for generating a command for moving a control target section along the first shape indicated in the first shape indication processing; and
an operation support processing for specifying the first shape in advance in accordance with an operation of the operation support section, the first shape being specified in advance by designating, in accordance with the operation of the operation support section, two or more portions among the plurality of tangible portions as instruction allowable areas and designating other portions among the plurality of tangible portions as instruction prohibited areas, the two or more portions designated as instruction allowable areas defining the first shape,
wherein, when the first shape has been specified in advance by the operation support processing in accordance with the operation of the operation support section, the first shape indication processing judges a user operation performed on a portion from among the plurality of tangible portions which is designated as an instruction prohibited area to be invalid and thereby prohibits a shape different from the first shape among from being indicated,
wherein the guide sheet is structured to be overlaid on the programming board to specify the first shape.

* * * * *